(12) United States Patent
Mather et al.

(10) Patent No.: US 11,588,571 B2
(45) Date of Patent: Feb. 21, 2023

(54) SEPARATOR MODULES FOR TERMINAL BODIES

(71) Applicant: COMMSCOPE TECHNOLOGIES LLC, Hickory, NC (US)

(72) Inventors: David James Mather, Altrincham (GB); Jan Jozef Julia Maria Erreygers, Tielt-Winge (BE); Salvatore Tuccio, Kessel-Lo (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/571,241

(22) Filed: Jan. 7, 2022

(65) Prior Publication Data
US 2022/0209883 A1 Jun. 30, 2022

Related U.S. Application Data

(63) Continuation of application No. 17/265,591, filed as application No. PCT/US2019/044659 on Aug. 1, 2019, now Pat. No. 11,223,442.
(Continued)

(51) Int. Cl.
*H04B 10/00* (2013.01)
*H04J 14/02* (2006.01)
(Continued)

(52) U.S. Cl.
CPC .......... *H04J 14/0219* (2013.01); *H04B 10/27* (2013.01); *H04J 14/0213* (2013.01); *H04J 14/0227* (2013.01)

(58) Field of Classification Search
CPC ............. H04J 14/0201; H04J 14/0202; H04B 10/25751; H04B 10/25753; H04B 10/25756
See application file for complete search history.

(56) References Cited

U.S. PATENT DOCUMENTS 5,990,929 A 11/1999 Sandaluk
6,091,301 A 7/2000 Vogt
(Continued)

FOREIGN PATENT DOCUMENTS

CN 202334775 U 7/2012
GB 2 513 657 A 11/2014
(Continued)

OTHER PUBLICATIONS

International Search Report and Written Opinion of the International Searching Authority for International Patent Application No. PCT/US2019/044659 dated Nov. 18, 2019, 9 pages.
(Continued)

*Primary Examiner* — Daniel G Dobson
(74) *Attorney, Agent, or Firm* — Merchant & Gould P.C.

(57) ABSTRACT

Signal distribution arrangements are assembled by selecting a terminal body and a tap module combination that provides the desired signal strength at the intended position in an optical network. Each terminal body includes an input connection interface, a pass-through connection interface, a module connection interface, and multiple drop connection interfaces. Each tap module houses an optical tap having an asymmetric split ratio. Most of the optical signal power received at the signal distribution arrangement passes to the pass-through connection interface. A portion of the optical signal power is routed to the drop connection interfaces (e.g., via a symmetrical optical power splitter). The tap module and terminal body combination are selected based on the desired number of drop connection interfaces and to balance the asymmetric split ratio with the symmetric split ratio.

20 Claims, 20 Drawing Sheets

Related U.S. Application Data

(60) Provisional application No. 62/714,423, filed on Aug. 3, 2018, provisional application No. 62/805,381, filed on Feb. 14, 2019.

(51) Int. Cl.
*H04B 10/27* (2013.01)
*H04J 14/00* (2006.01)

(56) References Cited

U.S. PATENT DOCUMENTS

| | | | |
|---|---|---|---|
| 6,678,442 B2 | 1/2004 | Gall et al. | |
| 7,706,643 B1 | 4/2010 | Meli et al. | |
| 9,762,322 B1 | 9/2017 | Amundson | |
| 2005/0246755 A1 | 11/2005 | Sandaluk | |
| 2006/0245687 A1* | 11/2006 | Gall | H04B 10/272 385/24 |
| 2006/0245688 A1* | 11/2006 | Gall | H04B 10/272 385/24 |
| 2009/0133095 A1 | 5/2009 | Phillips et al. | |
| 2009/0202205 A1* | 8/2009 | Conner | G02B 6/4201 385/48 |
| 2013/0294770 A1 | 11/2013 | Hino et al. | |
| 2013/0322883 A1 | 12/2013 | Dahlfort et al. | |
| 2018/0048392 A1* | 2/2018 | Amundson | H04B 10/27 |

FOREIGN PATENT DOCUMENTS

| | | |
|---|---|---|
| JP | 2015-060125 A | 3/2015 |
| KR | 10-1390043 B1 | 5/2014 |
| WO | 2016/166355 A1 | 10/2016 |
| WO | 2017/046190 A2 | 3/2017 |
| WO | 2018/007649 A1 | 1/2018 |
| WO | 2018/132576 A1 | 7/2018 |
| WO | 2018/231833 A1 | 12/2018 |
| WO | 2019/143510 A1 | 7/2019 |

OTHER PUBLICATIONS

ACcess Series AC800: User Manual, Teleste Corporation, Rev. 003, 14 pages (Nov. 2006); retrieved from the Internet: http://www.konturm.ru/catalogy/paspeng/ac800_usermanual_003.pdf [retrieved on May 17, 2016].

Extended European Search Report for European Patent Application No. 19844785.6 dated Mar. 24, 2022, 13 pages.

* cited by examiner

SEPARATOR MODULES FOR TERMINAL BODIES

CROSS-REFERENCE TO RELATED APPLICATIONS

This application is a continuation of U.S. patent application Ser. No. 17/265,591, filed on Feb. 3, 2021, now U.S. Pat. No. 11,223,442, which is a U.S. National Stage Application of PCT/US2019/044659, filed on Aug. 1, 2019, which claims the benefit of U.S. Patent Application Ser. No. 62/714,423, filed on Aug. 3, 2018, and claims the benefit of U.S. Patent Application Ser. No. 62/805,381, filed on Feb. 14, 2019, the disclosures of which are incorporated herein by reference in their entireties.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 110 that connects a number of end subscribers 115 (also called end users 115 herein) in a network. The central office 110 can additionally connect to a larger network such as the Internet (not shown) and a public switched telephone network (PSTN). The network 100 can also include fiber distribution hubs 130 having one or more optical splitters (e.g., 1-to-8 splitters, 1-to-16 splitters, or 1-to-32 splitters) that generate a number of individual fibers that may lead to the premises of an end user 115. The various lines of the network 100 can be aerial or housed within underground conduits.

The portion of the network 100 that is closest to central office 110 is generally referred to as the F1 region, where F1 is the "feeder fiber" from the central office 110. The portion of the network 100 closest to the end users 115 can be referred to as an F2 portion of network 100. The network 100 includes a plurality of break-out locations 125 at which branch cables 105 are separated out from the main cable lines 120. Branch cables 105 are often connected to drop terminals 104 that include connector interfaces for facilitating coupling of the fibers of the branch cables to a plurality of different subscriber locations 115.

Optical power splitters can be incrementally added to the fiber distribution hubs 130. Optical power splitters also can be disposed in the drop terminals 104. Each of the optical power splitters can split optical signals onto a plurality of splitter outputs so that a single fiber feeder cable can provide service to multiple subscribers.

Improvements are desired.

SUMMARY

An optical network includes a feeder cable from which one or more distribution cables branch (e.g., via optical splice, fanout, etc.). Connections between different optical fibers or between optical fibers and various pieces of equipment are made at nodes in the optical network (e.g., at fiber distribution hubs, at drop terminals, etc.). Signal distribution arrangements can be disposed at some of the network nodes. Each signal distribution arrangement includes an input that receives an optical fiber carrying optical signals. Each signal distribution arrangement also includes a plurality of outputs including a pass-through output and a plurality of drop outputs. Each of the outputs receives a portion of the optical signals received at the input. The pass-through output receives a larger portion (e.g., a higher power percentage, a greater number of wavelengths, etc.) of the optical signals compared to the drop outputs.

In accordance with some aspects of the present disclosure, each signal distribution arrangement includes a terminal body and a separator module. The terminal body is selected from a plurality of terminal body types and the separator module is selected from a plurality of separator module types. Each terminal body type includes a module connection interface location and a plurality of drop connection interface locations. Each separator module type includes an input connection interface location and an optical device (e.g., an asymmetric optical tap, a wave division multiplexer, a wave division demultiplexer, a wave division multiplexer/demultiplexer, etc.) configured to separate an input signal into a pass-through signal and at least one output signal. For convenience, the term "WDM" is used herein to refer to any of a wavelength division multiplexer, a wave division demultiplexer, and a wave division multiplexer/demultiplexer.

In certain implementations, the terminal body includes an optical power splitter. In certain examples, different terminal body types have optical power splitters with a different split ratio (e.g., 1:2, 1:4, 1:8, 1:12, 2:2, 2:4, 2:8, etc.) from the optical power splitters of the other terminal body types. In some implementations, the separator modules include tap modules, which each house an asymmetric optical tap. In certain examples, different tap module types have asymmetrical optical taps with a different tap ratio from the asymmetrical optical taps of the other tap module types. In other implementations, the separator modules include WDM modules, which each house a WDM. In certain examples, different WDM module types have WDMs filtering out different wavelengths from the WDMs of the other WDM module types.

An installer assembles a component pair including a terminal body, which has a selected terminal body type, and a separator module, which has a selected separator module type, to form a signal distribution arrangement at a node in the optical network. The installer selects the separator module type and the terminal body type to obtain at the node and/or at subsequent nodes a particular number of drop connection interface locations at each of which a particular signal strength or a particular signal wavelength (or wavelength band) is available.

In some implementations, the signal strength of the drop outputs at the node can be modified (e.g., increased or decreased) by removing a tap module from the terminal body of the signal distribution arrangement, selecting a new tap module having a different tap module type, and installing the new tap module at the terminal body. In certain examples, all optical fibers coupled to the signal distribution arrangement are anchored to the terminal body and not to the tap module. Accordingly, switching out the tap module does not affect cabling of the optical fibers. Therefore, the signal strength of the drop outputs can be modified without recabling the optical fibers at the signal distribution arrangement.

In certain implementations, the signal strength of the drop outputs of signal distribution arrangements at downstream nodes can be modified by removing the tap module from the terminal body, selecting a new tap module having a different tap module type, and installing the new tap module at the terminal body.

In certain implementations, the signal power branching off from a particular node in the optical network can be increased or decreased after installation by removing the tap module from the terminal body and installing a new tap module having a different tap module type.

In other implementations, the signal wavelengths received at the drop outputs at the node can be changed by removing a WDM module from the terminal body of the signal distribution arrangement, selecting a new WDM module having a different WDM module type, and installing the new WDM module at the terminal body. In certain examples, all optical fibers coupled to the signal distribution arrangement are anchored to the terminal body and not to the WDM module. Accordingly, switching out the WDM module does not affect cabling of the optical fibers. Therefore, the signal wavelengths dropped at the drop outputs can be modified without recabling the optical fibers at the signal distribution arrangement.

In certain examples, the separator module has a plug-and-play type connection with the terminal body to facilitate installation of the separator module at the terminal body. In certain examples, the separator module has a plug-and-play type connection with the terminal body to facilitate removal of the separator module from the terminal body. In certain examples, the separator module has a plug-and-play type connection with the terminal body to facilitate replacement of one separator module with another separator module at the terminal body.

In some examples, the terminal body is configured for strand installation. In other examples, the terminal body is configured for handhole installation. In other examples, the terminal body is configured for wall mount installation. In other examples, the terminal body is configured for pole mount installation. In other examples, the terminal body is configured for pedestal installation. In certain examples, the terminal body includes an optical termination enclosure (OTE).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
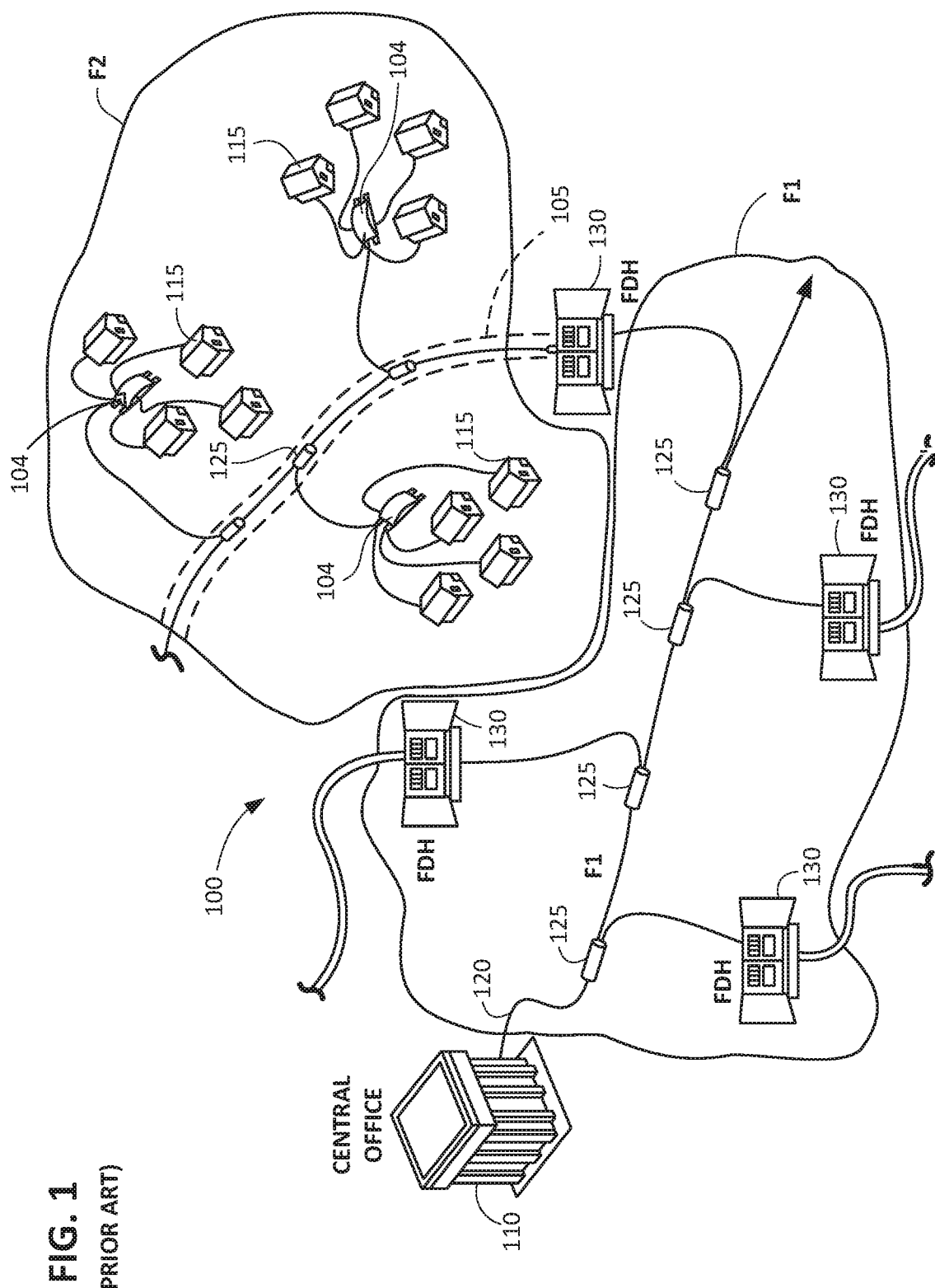
FIG. 1 shows a passive fiber optic network.

Reference will now be made in detail to exemplary aspects of the present disclosure that are illustrated in the accompanying drawings. Wherever possible, the same reference numbers will be used throughout the drawings to refer to the same or like parts.

Referring to the figures in general, each signal distribution arrangement 150, 150A, 150B, 150', 200, 200', 220, 220', 240 includes an input 153, 177', 203, 217, 203A, 203B, 237A, 237B, 257 that receives optical signals (e.g., via a plug-in cable, via an adapter port, etc.) from a central office or other network transmission point. Each signal distribution arrangement 150, 150A, 150B, 150', 200, 200', 220, 220', 240 also includes a plurality of outputs including a pass-through output 154, 178', 204, 218, 204A, 204B, 238A, 238B, 258 and a plurality of add/drop outputs 156, 206, 226, 246. Each of the outputs receives a portion (e.g., a power percentage, a wavelength or wavelength band, frequency range, etc.) of the optical signals received at the input. In general, the pass-through output 154, 178', 204, 218, 204A, 204B, 238A, 238B, 258 receives a larger portion (e.g., a higher power percentage, a greater number of wavelengths, a greater number of signal frequencies, etc.) of the optical signals compared to the drop outputs 156, 206, 226, 246.

As the term is used herein, an "add/drop output" refers to an output at which a signal may be added and/or dropped. For example, in some examples, bidirectional transmission is used with the signal distribution arrangement 150, 150A, 150B, 150', 200, 200', 220, 220', 240. In such examples, both transmit and receive optical signals are routed to each add/drop output 156, 206, 246. In other examples, unidirectional transmission can be used. In such examples, the terminal body defines separate add connection interface locations 226, 226A and drop connection interface locations 226, 226B.

In certain implementations, one or more of the inputs and outputs include connection interface locations. As the term is used herein, a "connection interface location" refers to a location at which an optical connection is made between one or more pluggable optical connectors and one or more optical adapters. Each optical adapter has an interior port and an exterior port. In certain examples, the exterior port of the optical adapter is ruggedized (e.g., robust and environmentally sealed). In certain implementations, each input includes an optical adapter. In certain implementations, each add/drop output includes an optical adapter. In certain implementations, each pass-through output includes an optical adapter. In other examples, any of the inputs and outputs can include a pluggable optical connector.

In accordance with some aspects of the present disclosure, each signal distribution arrangement 150, 150A, 150B, 150', 200, 200', 220, 220', 240 includes a terminal body 151, 151', 201, 201', 221, 221', 241 and a separator module 170, 170', 210, 210', 230, 230', 250. In some implementations, the terminal body 151, 151', 201, 201', 221, 221' is selected from a plurality of types of terminal bodies and the separator module 170, 170', 210, 210', 230, 230' is selected from a corresponding plurality of types of separator modules. In other implementations, a plurality of types of separator module 250 can be used with a common terminal body 241.

Each terminal body type includes a module connection interface location 155, 155', 205, 205', 225, 225', 243, 245 and a plurality of drop connection interface locations 156, 206, 226, 246. Each separator module type includes a terminal connection interface location 173, 173', 213, 213', 233, 233', 253, 259 and an optical device (e.g., an asymmetric optical tap, a wave division multiplexer, a wave division demultiplexer, a wave division multiplexer/demultiplexer, a bandpass filter, etc.) configured to separate an input signal into a pass-through signal and at least one drop signal. For convenience, the term "WDM" is used herein to refer to any of a wave division multiplexer, a wave division demultiplexer, and a wave division multiplexer/demultiplexer. In certain implementations, a wavelength division multiplexer/demultiplexer is implemented using a cyclic arrayed waveguide grating (AWG) as will be described in more detail herein with reference to FIGS. 15-18.

In some implementations, the separator module 170, 170', 210, 210', 230, 230', 250 has a plug-and-play type connection with the terminal body 151, 151', 201, 201', 221, 221', 241 to facilitate installation of the separator module 170, 170', 210, 210', 230, 230', 250 at the terminal body 151, 151', 201, 201', 221, 221', 241. For example, the module connection interface location 155, 155', 205, 205', 225, 225', 243 may directly connect to the terminal connection interface location 173, 173', 213, 213', 233, 233', 253. In certain examples, the separator module 170, 170', 210, 210', 230, 230', 250 has a plug-and-play type connection with the terminal body 151, 151', 201, 201', 221, 221', 241 to facilitate removal of the separator module 170, 170', 210, 210', 230, 230', 250 from the terminal body 151, 151', 201, 201', 221, 221', 241. In certain examples, the separator module 170, 170', 210, 210', 230, 230', 250 has a plug-and-play type connection with the terminal body 151, 151', 201, 201', 221, 221', 241 to facilitate replacement of one type of separator module 170, 170', 210, 210', 230, 230', 250 with another type of separator module 170, 170', 210, 210', 230, 230', 250 at the terminal body 151, 151', 201, 201', 221, 221', 241.

In other implementations, the separator module 170, 170', 210, 210', 230, 230', 250 may be optically coupled to the terminal body 151, 151', 201, 201', 221, 221', 241 using an optical cable extending between the module connection interface location 155, 155', 205, 205', 225, 225', 245 and the terminal connection interface location 173, 173', 213, 213', 233, 233', 259.

In certain implementations, the module connection interface location 155, 155', 205, 205', 225, 225', 243, 245 and the terminal connection interface location 173, 173', 213, 213', 233, 233', 253, 259 are ruggedized to environmentally seal between the separator module 170, 170', 210, 210', 230, 230', 250 and the terminal body 151, 151', 201, 201', 221, 221', 241. In an example, the module connection interface location 155, 155', 205, 205', 225, 225', 243 and the terminal connection interface location 173, 173', 213, 213', 233, 233', 253 are configured to directly form a ruggedized connection. In another example, each of the module connection interface location 155, 155', 205, 205', 225, 225', 245 and the terminal connection interface location 173, 173', 213, 213', 233, 233', 259 is configured to form a ruggedized connection with an end of a cable.

In some implementations, the terminal body 151, 151' includes an optical power splitter 160. In certain examples, different terminal body types have optical power splitters with a different split ratio from the optical power splitters of the other terminal body types. In other implementations, the same cyclic AWG 244 can be used in multiple terminal bodies 241 within a common system as will be described in more detail herein. In other implementations, the terminal body 241 includes a cyclic AWG 244. In still other implementations, the terminal body 201, 201', 221, 221' does not contain an optical component for splitting optical signals.

In some implementations, the separator modules 170, 170' include tap modules 170, 170', which each house an asymmetric optical tap 172. In certain examples, different tap module types have asymmetrical optical taps with different tap ratios from the asymmetrical optical taps of the other tap module types. In other implementations, the separator modules 210, 210', 230, 230' include WDM modules 210, 210', 230, 230', which each house a WDM 212, 232A, 232B. In certain examples, different WDM module types have WDMs that filter out different wavelengths from the WDMs of the other WDM module types. In still other implementations, the separator module 250 includes a passband filter 255. Different types of separator modules 250 have passband filters 255 that filter to select different signal frequencies (i.e., different bandpass signals). As will be understood by one of skill in the art, the signal frequency relates to the signal wavelength and the use of the phrase "signal frequencies" herein is not meant to exclude filters that select signals based on wavelengths.

In some examples, the terminal body 151, 151', 201, 201', 221, 221', 241 is configured for strand installation. In other examples, the terminal body 151, 151', 201, 201', 221, 221', 241 is configured for handhole installation. In other examples, the terminal body 151, 151', 201, 201', 221, 221', 241 is configured for wall mount installation. In other examples, the terminal body 151, 151', 201, 201', 221, 221', 241 is configured for pole mount installation. In other examples, the terminal body 151, 151', 201, 201', 221, 221', 241 is configured for pedestal installation. In certain examples, the terminal body 151, 151', 201, 201', 221, 221', 241 includes an optical termination enclosure (OTE). In certain examples, the terminal body 151, 151', 201, 201', 221, 221', 241 includes multi-service terminal (MST).

Figure 2:
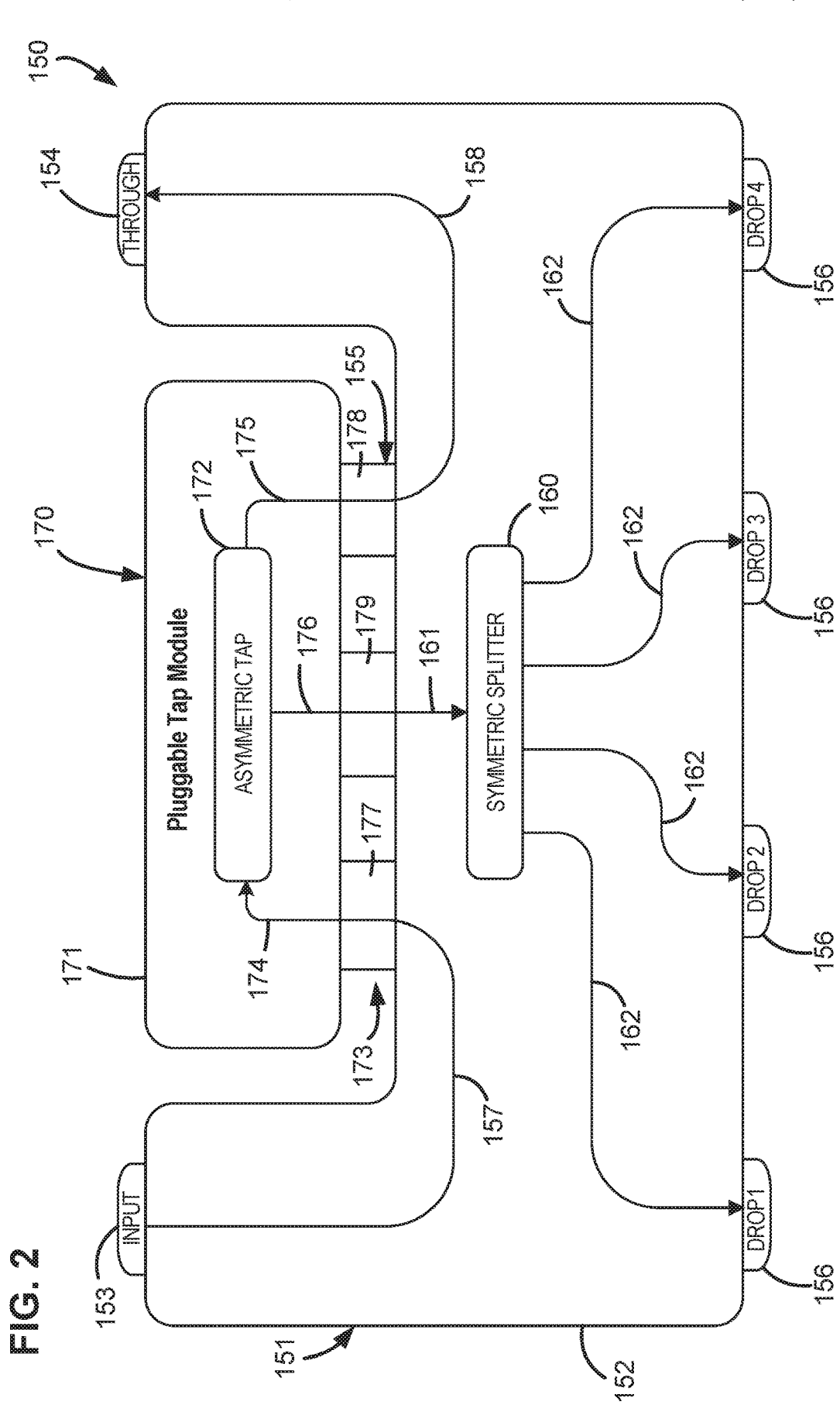
FIG. 2 is a schematic diagram of an example signal distribution arrangement including an example tap module mounted to an example terminal body in accordance with the principles of the present disclosure.

Referring to FIG. 2, an example signal distribution arrangement 150 includes a terminal body 151 and a separator module (e.g., a tap module) 170. The terminal body 151 defines an input connection interface location 153, a pass-through connection interface location 154, a module connection interface location 155, and a plurality of drop connection interface locations 156. As the term is used herein, a "drop" connection interface location is not meant to imply that optical signals travel in only one particular direction. Rather, the tap module 170 is configured to pass optical signals in both upstream and downstream directions. Accordingly, the "drop" connection interface location also can function as an "add" connection interface location.

In certain implementations, the input connection interface location 153 and the pass-through connection interface location 154 are optically coupled to the module connection interface location 155 at which the tap module 170 may be coupled. In certain examples, the drop connection interface locations 156 also are optically coupled to the module connection interface location 155.

Providing the input and pass-through connection interface locations 153, 154 on the terminal body 151 enables the tap module 170 to be added, removed, or replaced without recabling the input and pass-through cables at the signal distribution arrangement 150.

In some examples, the module connection interface location 155 includes a plurality of pluggable optical connectors. In other examples, the module connection interface location 155 includes a plurality of optical adapters. In still other examples, the module connection interface location 155 includes a single pluggable optical connector (e.g., a multi-fiber connector or a single-fiber connector). In still other examples, the module connection interface location 155 includes a single optical adapter (e.g., a multi-fiber adapter or a single-fiber adapter).

In certain implementations, the terminal body 151 houses an optical power splitter 160. The optical splitter 160 has an input 161 and a plurality of outputs 162. The optical splitter 160 power splits (e.g., symmetrically power splits) optical signals received at the input 161 onto the outputs 162. The outputs 162 are routed to the drop connection interface locations 156. For example, each output 162 may be routed to a respective drop connection interface location 156. The input 161 of the splitter 160 is routed to the module connection interface location 155. Accordingly, the drop connection interface locations 156 may be optically coupled to the module connection interface location 155 via the optical power splitter 160.

The tap module 170 includes a body 171 housing an optical tap 172 and defining a terminal connection interface location 173. The tap module 170 has an input line 174, a first output line 175, and a second output line 176 that are each routed between the optical tap 172 and the terminal connection interface location 173. The optical tap 172 is configured to power split (e.g., asymmetrically power splits) an optical signal received at the input line 174 into a first split signal on the first output line 175 and a second split signal on the second output line 176. The second split signal has less power than the first split signal.

The terminal connection interface location 173 of the tap module body 171 is configured to mechanically couple to the terminal body 151 at the module connection interface location 155. For example, the tap module 170 may be operably coupled to the terminal body 151 via a twist-to-lock fastening arrangement (e.g., threading, bayonet connection, etc.), via a snap-fit fastening arrangement (e.g., latches), or using any desired fastening mechanism (e.g., friction fit, screws, etc.).

In some examples (e.g., see FIG. 7), the terminal connection interface location 173 of the tap module 170 includes a single pluggable optical connector (e.g., an MPO connector, a hardened multi-fiber optical connector (HMFOC), etc.) through which the input line 174, the first output line 175, and the second output line 176 extend. In such examples, the terminal body 151 defines a multi-fiber adapter at the module connection interface location 155. In other examples (e.g., see FIG. 4), the terminal connection interface location 173 of the tap module 170 includes multiple pluggable optical connectors 177, 178, 179. The input line 174 extends through a first of the pluggable optical connectors 177; the first output line 175 extends through a second of the pluggable optical connectors 178; and the second output line 176 extends through a third of the pluggable optical connectors 179. In such examples, the terminal body 151 defines corresponding single-fiber adapters at the module connection interface location 155.

When the tap module 170 is mechanically coupled to the terminal body 151, the input line 174 is optically coupled to the input connection interface location 153, the first output line 175 is optically coupled to the pass-through connection interface location 154, and the second output line 176 is optically coupled to the drop connection interface locations 156 (e.g., via the splitter 160). Accordingly, any optical signals received at the input connection interface location 153 of the terminal body are first asymmetrically power split by the optical tap 172 of the tap module 170 so that the portions of the optical signals having the majority of the power are carried to the pass-through connection interface location 154 of the terminal body 151. The portions of the optical signals having less power are carried to the optical power splitter 160, which symmetrically power splits the signals to the drop connection interface locations 156. Accordingly, the optical signals available at the drop connection interface locations 156 are substantially less powerful than the optical signals available at the pass-through connection interface location 154.

In certain examples, the input connection interface location 153 of the terminal body 151 is not optically coupled to the pass-through connection interface location 154 when the tap module 170 is not mechanically coupled to the terminal body 151. Rather, the input connection interface location 153 can be optically coupled to the pass-through connection interface location 154 via the tap module 170.

In certain examples, the input connection interface location 153 is not optically coupled to the drop connection interface locations 156 when the tap module 170 is not mechanically coupled to the terminal body 151. Rather, the input connection interface location 153 can be optically coupled to the drop connection interface locations 156 via the tap module 170.

In alternative implementations, the optical tap 172 within the tap module 170 may asymmetrically split optical signals between the first output 175, the second output 176, and a third output. Other additional outputs of the optical tap module 172 also may be possible. Signals split to the third output would have a smaller power level than signals split to the first output 175. In some examples, the signals split to the third output would have the same power level as the signals split to the second output 176. In other examples, the signals split to the third output may have a greater or lesser power level than the signals split to the second output 176. In an example, the third output may be directed directly to a first of the drop connection interface locations 156 without first passing through the optical splitter 160. Accordingly, optical signals available at the first drop connection interface location 156 may be stronger than optical signals available from a remainder of the drop connection interface locations 156 that receive the outputs 162 of the optical splitter 160.

Referring back to FIG. 2, in certain implementations, the connection interface locations 153, 154, 155, 156 are ruggedized to environmentally seal between the terminal body 151 and the cables or modules received thereat. For example, the input connection interface location 153, the pass-through connection interface location 154, and/or the drop connection interface locations 156 may include gaskets or sealing surfaces against which gaskets may be pressed to seal the interior of the terminal body 151. In an example, each of the connection interface locations 153, 154, 155, 156 includes one or more a DLX adapters. In another example, the module connection interface location 155 includes an HMFOC adapter.

The module connection interface location 155 of the terminal body 151 and the terminal connection interface location 173 of the tap module 170 also may be configured to environmentally seal between the terminal body 151 and the tap module 170. For example, one of the module connection interface location 155 and the terminal connection interface location 173 may include a gasket or other sealing mechanism and the other may include a sealing surface against which the gasket presses to create a seal.

In certain implementations, one or more of the connection interface locations 153-156 may be color-coded or otherwise marked with indicia to identify the connection interface location. For example, the input connection interface location 153 may be labeled with a first color (e.g., green), the pass-through connection interface location 154 may be labeled with a second color (e.g., yellow), and the drop connection interface locations 156 may be labeled with a third color (e.g., black), with the first, second, and third colors being different colors. In examples, the module connection interface location 155 may be labeled with a fourth color (e.g., purple) that is different from the first, second, and third colors. In certain implementations, the locations 153-156 are labeled using colored dust caps 159, colored rings around the locations (e.g., rings around the external ports of the optical adapters), colored optical adapters, colored plug connectors, etc.

Figure 3:
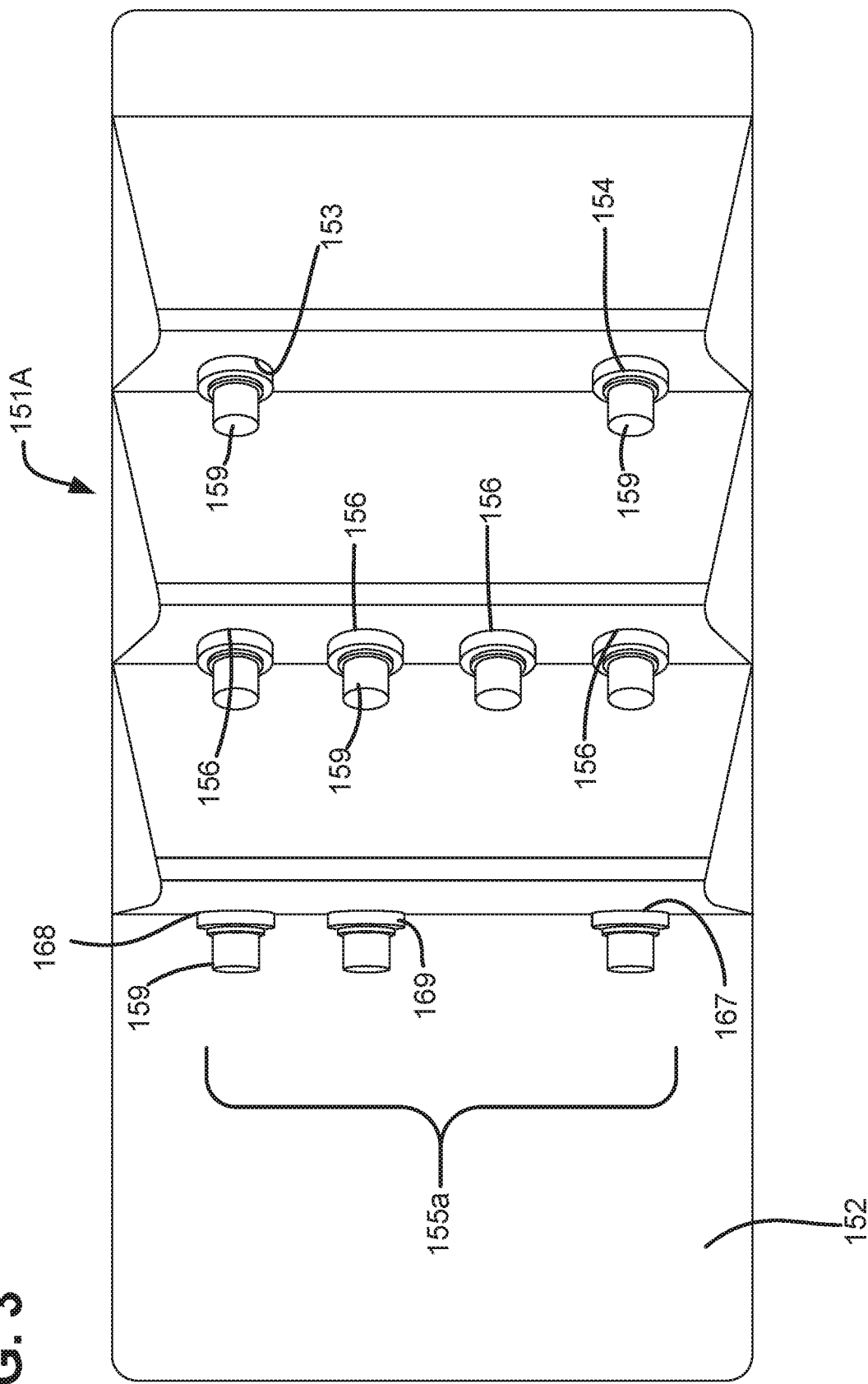
FIG. 3 is a top plan view of an example terminal body configured in accordance with the principles of the present disclosure, the terminal body including a module connection interface location having three optical adapters at which dust caps are received.

FIG. 3 illustrates one example implementation 151A of a terminal body 151. The example terminal body 151A includes a housing 152 having an input connection interface location 153, a pass-through connection interface location 154, a module connection interface location 155, and four drop connection interface locations 156. In other implementations, the terminal body 151A may have a greater or lesser number (e.g., two, three, six, eight, ten, twelve, sixteen, etc.) of drop connection interface locations 156. In an example, the number of drop connection interface locations 156 matches the number of symmetrical power splitter outputs 162.

In the example shown in FIG. 3, the module connection interface location 155 includes three single-fiber optical adapters—a first single-fiber optical adapter 167, a second single-fiber optical adapter 168, and a third single-fiber optical adapter 169. In other examples, the module connection interface location 155 could have three single-fiber pluggable connectors instead of the adapter. In certain examples, a first optical line 157 extends between the input connection interface location 153 and an interior port of the first single-fiber optical adapter 167, a second optical line 158 extends between the pass-through connection interface location 154 and an interior port of the second single-fiber optical adapter 168, and a third optical line extends between the splitter input 161 and an interior port of the third single-fiber optical adapter 169. In certain examples, the first, second, and third optical lines are terminated at optical connectors plugged into the respective interior ports.

In certain implementations, the connection interface locations of the terminal body 151 are disposed in rows along the body 151. In the example shown in FIG. 3, the input connection interface location 153 and the pass-through connection interface location 154 are disposed in a first row, the drop connection interface locations 156 are disposed in a second row, and the single-fiber adapters 167-169 of the module connection interface location 155 are disposed in a third row. In other examples, the drop connection interface locations 156 may be arranged in multiple rows.

In certain examples, the input connection interface location 153 and the pass-through connection interface location 154 face in a common direction. In certain examples, the drop connection interface locations 156 face in the same direction as the input connection interface location 153. In certain examples, the module connection interface location 155 faces in the same direction as the input connection interface location 153.

In certain examples, the connection interface locations of the terminal body 151 are disposed on stepped or waisted surfaces. In certain examples, the connection interface locations of the terminal body 151 are disposed on angled surfaces (e.g., surfaces angled relative to a mounting surface of the terminal body 151).

Figure 4:
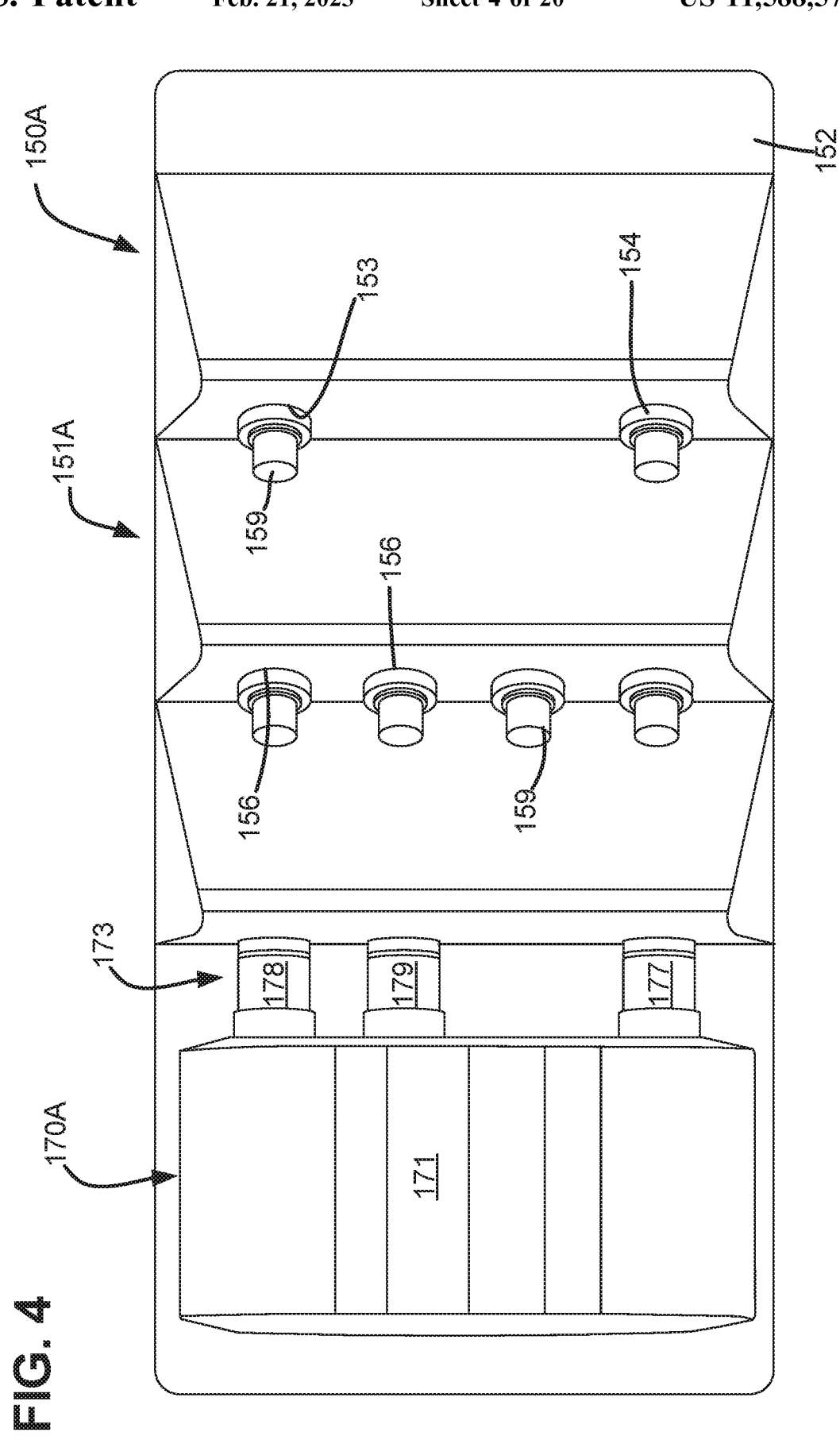
FIG. 4 is a top plan view of the terminal body of FIG. 3 with an example tap module mounted at the module connection interface location to form an example signal distribution arrangement.
Figure 5:
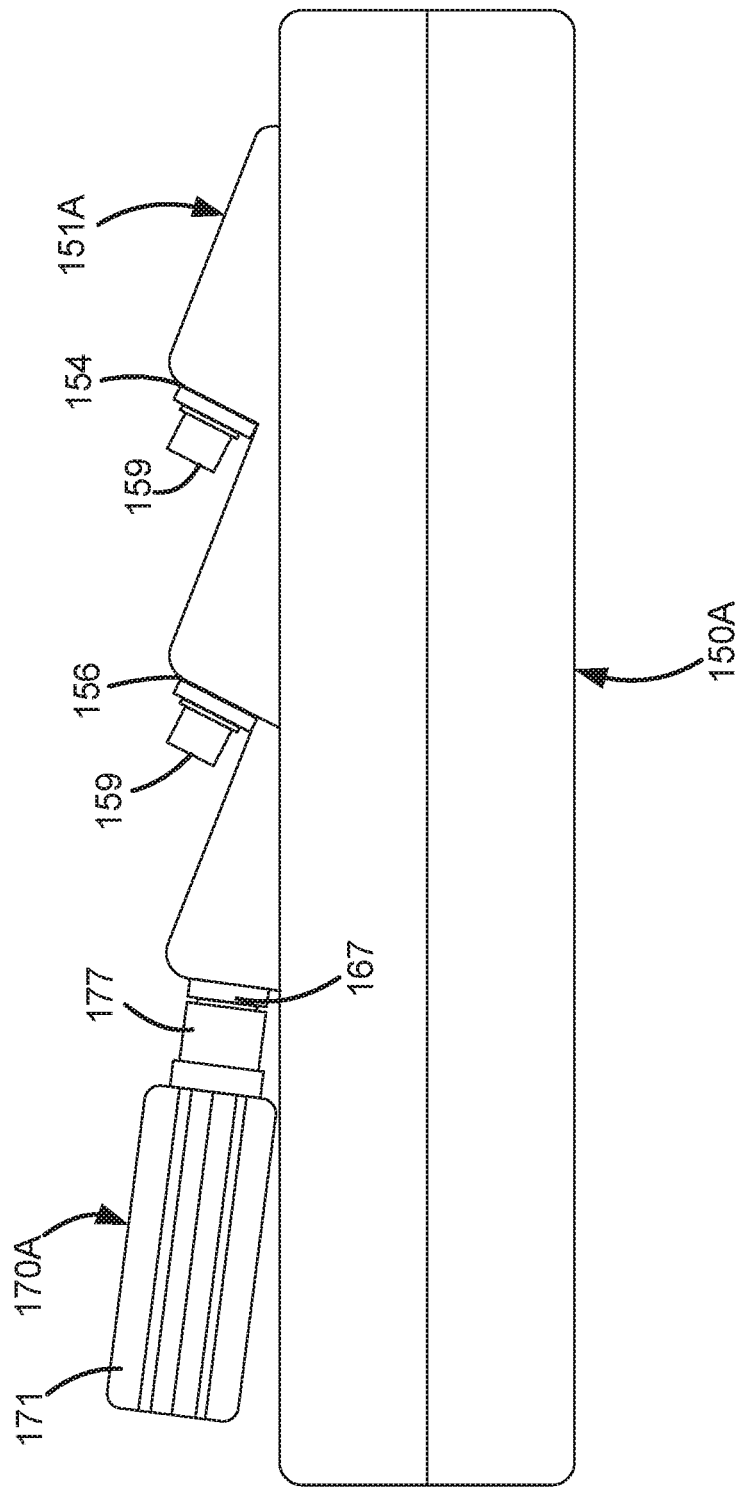
FIG. 5 is a side elevational view of the signal distribution arrangement of FIG. 4.

FIGS. 4 and 5 illustrate an example implementation 170A of a tap module 170 mounted to the terminal body 151A of FIG. 3. The tap module 170A includes a body 171 defining a terminal connection interface location 173. The terminal connection interface location 173 of the tap module 170A includes three single-fiber pluggable connectors 177, 178, 179. When the tap module 170A is mounted to the terminal body 151A, the first pluggable connector 177 enters the exterior port of the first optical adapter 167, the second pluggable connector 178 enters the exterior port of the second optical adapter 168, and the third pluggable connector 179 enters the exterior port of the third optical adapter 169. The tap module 170A optically couples the first optical adapter 167 to the second and third adapters 168, 169.

Figure 6:
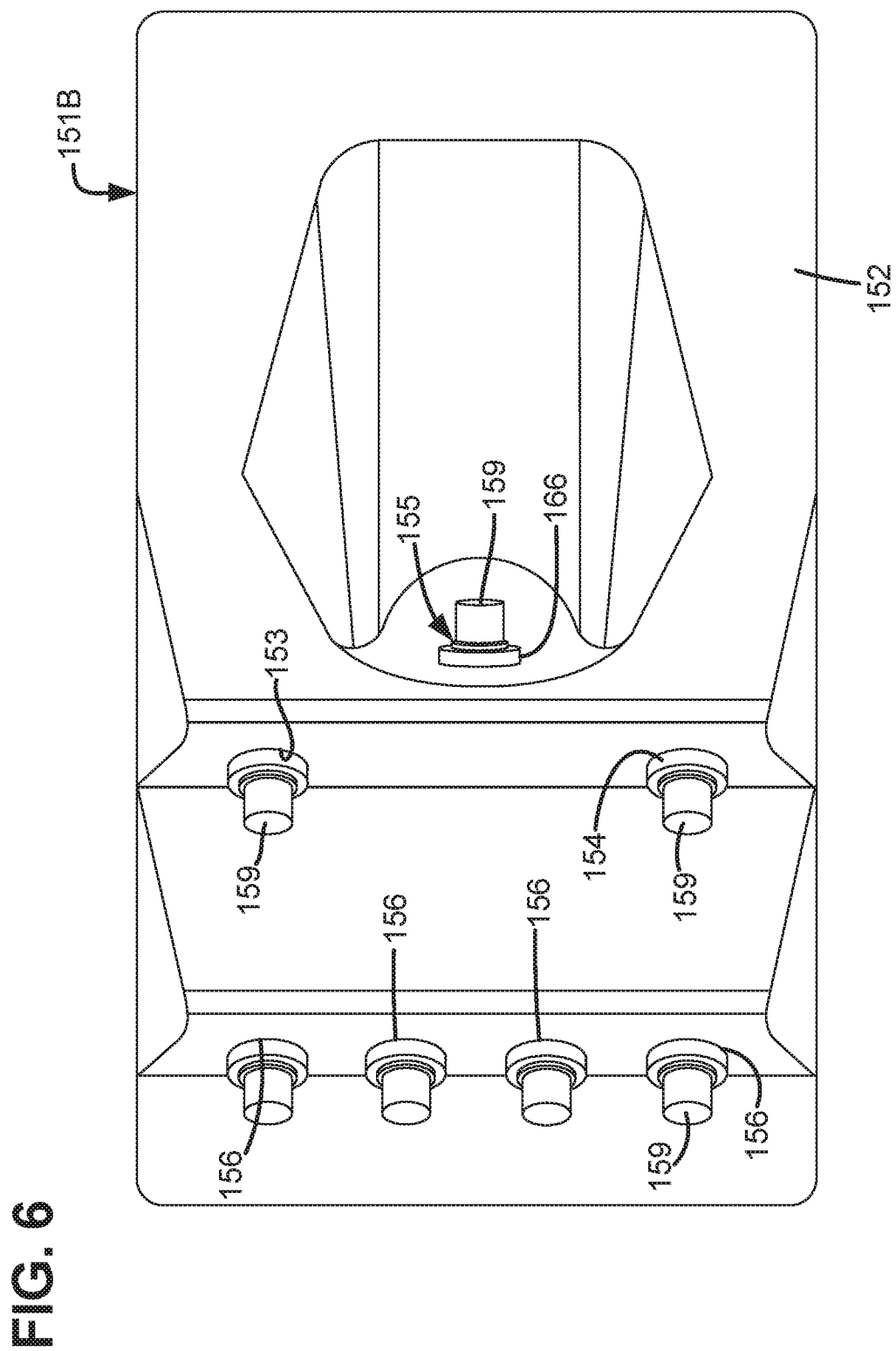
FIG. 6 is a top plan view of another example terminal body configured in accordance with the principles of the present disclosure, the terminal body including a module connection interface location having a multi-fiber adapter at which a dust cap is received.

FIG. 6 illustrates one example implementation 151B of a terminal body 151. The example terminal body 151B includes a housing 152 having an input connection interface location 153, a pass-through connection interface location 154, a module connection interface location 155, and four drop connection interface locations 156. In other implementations, the terminal body 151B may have a greater or lesser number (e.g., two, three, six, eight, ten, twelve, sixteen, etc.) of drop connection interface locations 156. In an example, the number of drop connection interface locations 156 matches the number of symmetrical power splitter outputs 162.

In the example shown in FIG. 6, the module connection interface location 155 includes one multi-fiber adapter 166. In other examples, the module connection interface location 155 could have a multi-fiber pluggable connector instead of the multi-fiber adapter.

In certain examples, a first optical line 157 extends between the input connection interface location 153 and a multi-fiber connecter plugged into an interior port of the multi-fiber adapter 166. A second optical line 158 extends between the pass-through connection interface location 154 and the multi-fiber connector. A third optical line extends between the splitter input 161 and the multi-fiber connector. In the example where the multi-fiber connector is an MPO connector, the other optical lines of the MPO connector (e.g., the other nine or twenty-one lines) may remain dark.

In certain implementations, at least some of the connection interface locations of the terminal body 151 are disposed in rows along the body 151. In the example shown in FIG. 6, the drop connection interface locations 156 are disposed in a first row, the input connection interface location 153 and the pass-through connection interface location 154 are disposed in a second row, and the multi-fiber adapter 166 of the module connection interface location 155 is disposed offset from the first and second rows. In other examples, the drop connection interface locations 156 may be arranged in multiple rows.

In certain examples, the input connection interface location 153 and the pass-through connection interface location 154 face in a common direction. In certain examples, the drop connection interface locations 156 face in the same direction as the input connection interface location 153. In certain examples, the module connection interface location 155 faces in a different direction as the input connection interface location 153. In certain examples, the module connection interface location 155 faces in a different direction as the drop connection interface locations 156.

In certain examples, the connection interface locations of the terminal body 151 are disposed on stepped or waisted surfaces. In certain examples, the connection interface locations of the terminal body 151 are disposed on angled surfaces (e.g., surfaces angled relative to a mounting surface of the terminal body 151).

Figure 7:
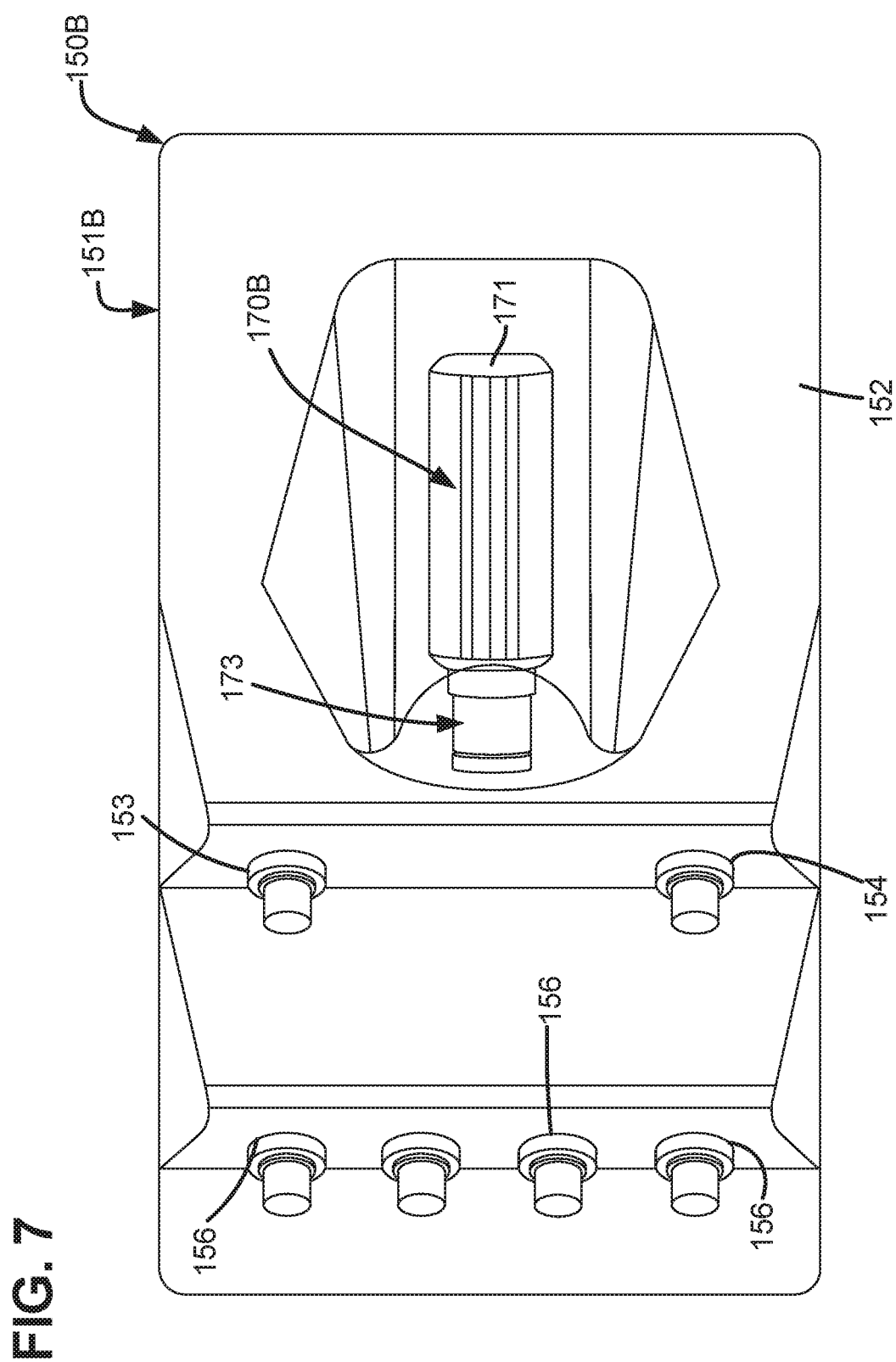
FIG. 7 is a top plan view of the terminal body of FIG. 6 with an example tap module mounted at the module connection interface location to form an example signal distribution arrangement.
Figure 8:
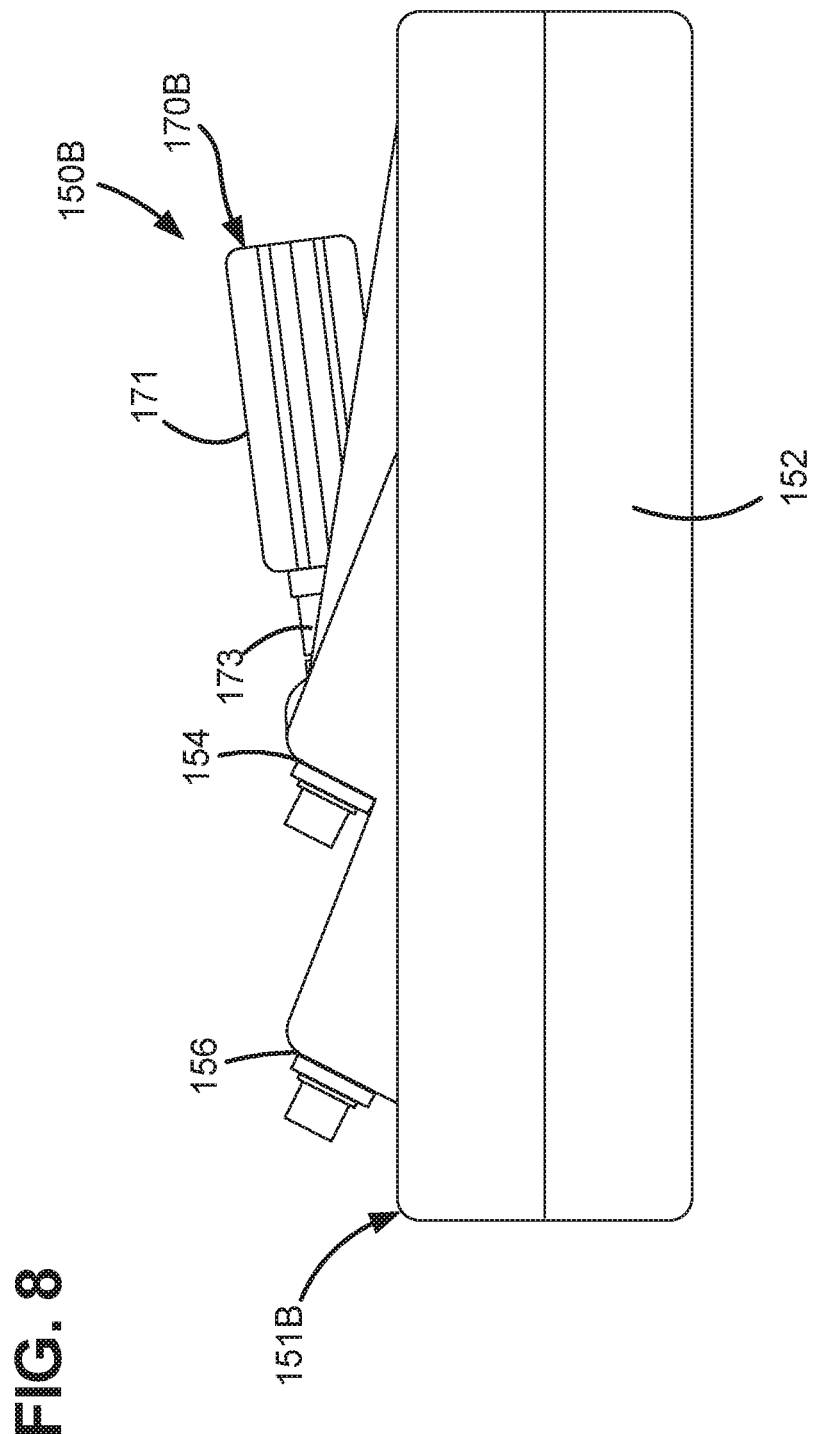
FIG. 8 is a side elevational view of the signal distribution arrangement of FIG. 7.

FIGS. 7 and 8 illustrate an example implementation 170B of a tap module 170 mounted to the terminal body 151B of FIG. 6. The tap module 170B includes a body 171 defining a terminal connection interface location 173. The terminal connection interface location 173 of the tap module 170B includes a multi-fiber pluggable connector. When the tap module 170B is mounted to the terminal body 151B, the pluggable connector of the terminal connection interface location 173 enters the multi-fiber optical adapter 166 of the module connection interface location 155 of the terminal body 151B.

In certain implementations, the tap modules 170, 170A, 170B discussed herein are field installable. For example, a tap module 170, 170A, 170B may have a plug-and-play type connection with a terminal body 151, 151A, 151B to facilitate installation and/or removal of the tap module 170, 170A, 170B at the terminal body 151, 151A, 151B. In certain examples, the tap modules 170, 170A, 170B may have threading or other fastening mechanism designed to fit with mounting structure (e.g., threading) at the terminal body 151, 151A, 151B.

In the examples shown in FIGS. 2-8, the tap module 170, 170A, 170B is externally pluggable (i.e., mounts to an exterior of the terminal body 151, 151A, 151B). In other examples, however, the tap module 170, 170A, 170B may be mounted within an interior of the terminal body 151, 151A, 151B so as to be environmentally sealed within the terminal body 151, 151a, 151B. In such examples, the module connection interface location 155 and terminal connection interface location 173 need not be ruggedized.

Figure 9:
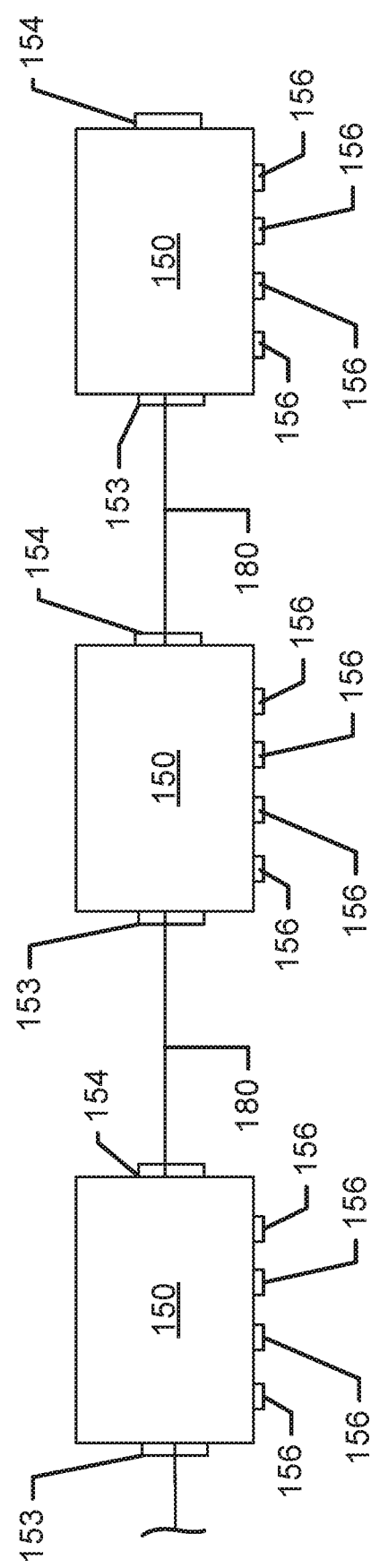
FIG. 9 is a schematic diagram of a portion of an optical network including signal distribution arrangements daisy-chained together.

Referring to FIG. 9, two or more signal distribution arrangements 150 may be daisy-chained together so that a cable 180 extends between the pass-through connection interface location 154 of a first signal distribution arrangement 150 and the input connection interface location 153 of a second signal distribution arrangement 150. Accordingly, the optical signals received at the second signal distribution arrangement 150 has less power than the optical signals received at the first signal distribution arrangement 150.

In certain implementations, an installer may have various types of terminal bodies 151 and various types of tap modules 170. Different types of terminal bodies 151 have splitters 160 with different split ratios. For example, a first terminal body type may have a splitter 160 with a 1:4 split ratio while a second terminal body type may have a splitter 160 with a 1:8 split ratio. Other split ratios are possible (e.g., 1:2, 1:6, 1:8, 1:10, 1:12, 1:16, 1:32, etc.).

Different types of tap modules 170 have optical taps 172 with different tap ratios. For example, a first tap module type may have an optical tap 172 with a tap ratio of 1:99 while a second tap module type has an optical tap 172 with a tap ratio of 1:90. Other tap ratios are possible (e.g., 1:99, 2:98, 3:97, ..., 49:51).

The terminal body type and the tap module type may be selected to achieve a particular signal strength at the drop connection interface locations 156 of the signal distribution arrangement 150. In certain implementations, the terminal body type may be selected based on the number of subscribers to be serviced (e.g., so that the number of subscribers to be serviced matches the number of drop connection interface locations).

In certain examples, the tap module type is selected based on the split ratio of the power splitter 160 of the selected terminal body type. In certain examples, the tap module type is selected based on the signal strength received at the input connection interface device 153 of the terminal body to receive the tap module. For example, when less power is received at the input connection interface location 153, an installer may decide to take a greater percentage of power for the second output 176 of the optical tap 172 to be provided to the optical splitter 160.

Figure 10:
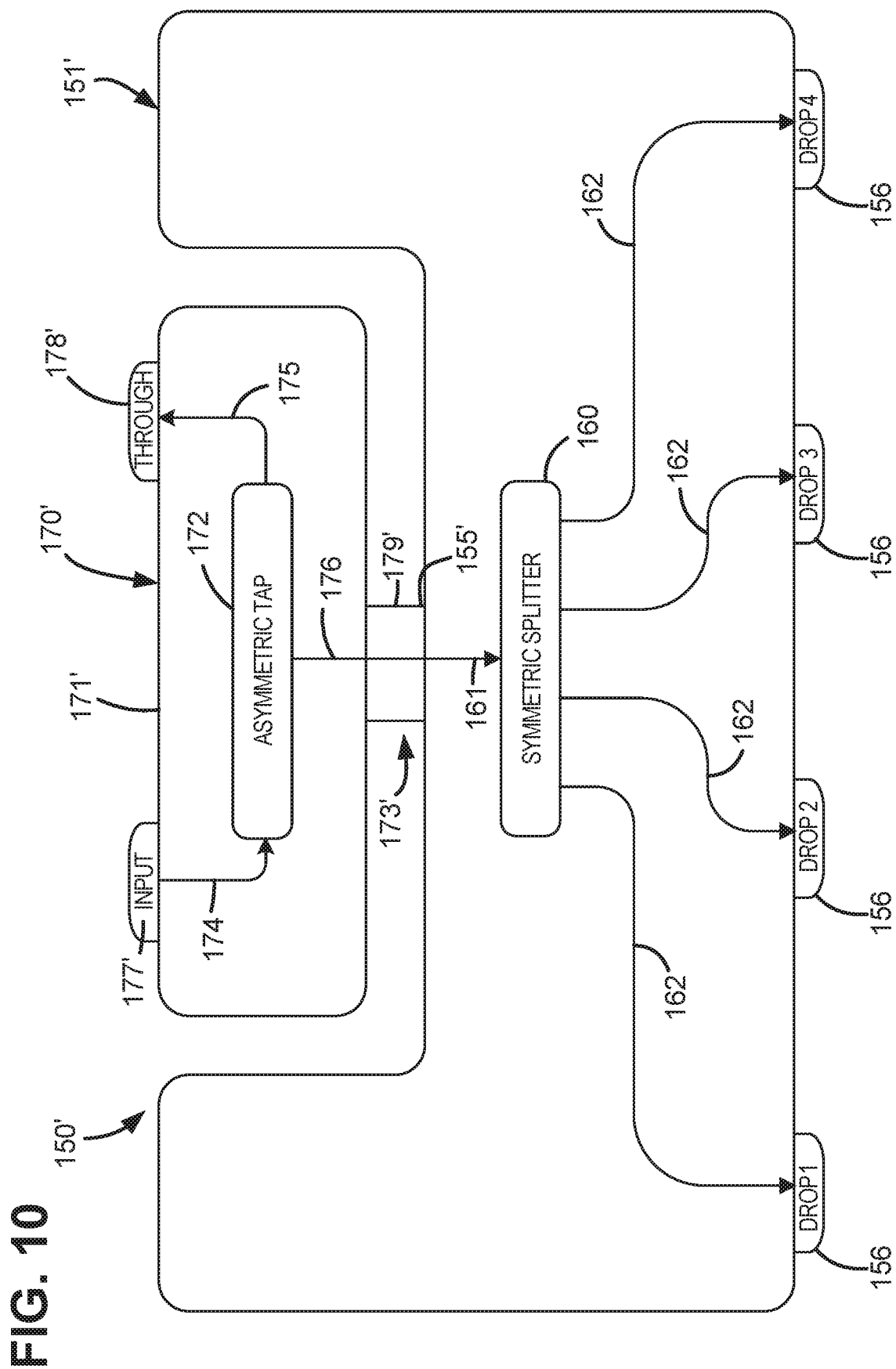
FIG. 10 is a schematic diagram of an example signal distribution arrangement including another example tap module mounted to another example terminal body in accordance with the principles of the present disclosure.

Referring to FIG. 10, another example signal distribution arrangement 150' includes a terminal body 151' and a tap module 170'. In the signal distribution arrangement 150', the input and output are provided on the tap module 170' instead of on the terminal body 151'. Providing the input and output on the tap module 170' instead of the terminal body reduces the number of connections within the signal distribution arrangement 150' compared to the signal distribution arrangement 150 of FIG. 2. For example, the signal distribution arrangement 150' eliminates the optical connection at the input connection interface location 177 and a pass-through connection interface location 178 shown in FIG. 2.

The terminal body 151' has a module connection interface location 155' and multiple drop connection interface locations 156. The terminal body 151' does not include an input connection interface location or a pass-through connection interface location. The terminal body 151' houses an optical power splitter 160 having an input 161 routed to the module connection interface location 155' and multiple outputs 162 each routed to one of the drop connection interface locations 156. The optical splitter 160 power splits (e.g., symmetrically power splits) optical signals received at the input 161 onto the outputs 162. In an example, the terminal body 151' is a multi-service terminal (MST).

In some implementations, the module connection interface location 155' includes an optical adapter port. In certain examples, the module connection interface location 155' is a single-fiber optical adapter port (e.g., an SC port, an LC port, etc.). In other implementations, the module connection interface location 155' includes a plug connector. In certain examples, the module connection interface location 155' is a single-fiber plug connector (e.g., an SC port, an LC port, etc.). In certain implementations, the module connection interface location 155' is ruggedized to environmentally seal between the terminal body 151' and the tap module 170'.

In some implementations, each drop connection interface location 156 includes an optical adapter port. In certain examples, each drop connection interface location 156 is a single-fiber optical adapter port (e.g., an SC port, an LC port, etc.). In other implementations, each drop connection interface location 156 includes a plug connector. In certain examples, each drop connection interface location 156 is a single-fiber plug connector (e.g., an SC port, an LC port, etc.). In certain implementations, the drop connection interface location 156 is ruggedized to environmentally seal between the terminal body 151' and a drop cable routed to the drop connection interface location 156.

The tap module 170' includes a body 171' housing an optical tap 172 and defining an input connection interface location 177', a pass-through connection interface location 178', and a terminal connection interface location 173'. The tap module 170' has an input line 174 routed between the optical tap 172 and the input connection interface location 177'. The tap module 170' has a first output line 175 routed between the optical tap 172 and the pass-through connection interface location 178'. The tap module 170' has a second output line 176 routed between the optical tap 172 and the terminal connection interface location 173'.

When the tap module 170' is mounted to the terminal body (e.g., when the terminal connection interface location 173' of the tap module 170' mechanically couples to the module connection interface location 155' of the terminal body 151'), the second output 176 of the optical tap 172 is optically coupled to the input 161 of the optical splitter 160. Accordingly, signals carried by the second output 176 of the optical tap are split onto the splitter outputs 162 routed to the drop connection interface locations 156 of the terminal body 151'.

In various example, the tap module 170' may be operably coupled to the terminal body 151' via a twist-to-lock fastening arrangement (e.g., threading, bayonet connection, etc.), via a snap-fit fastening arrangement (e.g., latches), or using any desired fastening mechanism (e.g., friction fit, screws, etc.).

Referring now to FIGS. 11-14, a signal distribution arrangement 200, 200', 220, 220' includes a terminal body 201, 201', 221, 221' defining one or more add and/or drop connection interface locations 206, 226A, 226B and a separator module (e.g., a WDM module) 210, 210', 230, 230' housing a WDM 212, 232A, 232B. The WDM 212, 232A, 232B receives optical signals at an input line 214, 214', 234A, 234B, 234A', 234B', adds and/or drops one or more predetermined wavelengths of the optical signals to respective add/drop lines 216, 216', 236A, 236B, 236A', 236B', and passes the remainder of the optical signals to a pass-through output line 215, 215', 235A, 235B, 235A', 235B'.

The terminal body 201, 201', 221, 221' defines a module connection interface location 205, 205', 225, 225' configured to fit with a terminal connection interface location 213, 213', 233, 233' of the WDM module 210, 210', 230, 230' to optically couple the add/drop lines 216, 216', 236A, 236B, 236A', 236B' to the add and/or drop connection interface locations 206, 226A, 226B. In some implementations, one of the module interface location 205, 205', 225, 225' and the terminal connection interface location 213, 213', 233, 233' is an externally accessible adapter port and the other is a plug-in connector that fits within the adapter port. In certain implementations, the adapter port and plug-in connector are ruggedized to environmentally seal between the adapter port and plug-in connector.

In some implementations, the WDM module 210, 210', 230, 230' and the terminal body 201, 201', 221, 221' have a twist-to-lock connection (e.g., threads, bayonet, etc.) therebetween. For example, the twist-to-lock connection may be formed between the adapter port and plug-in connector. In other implementations, the WDM module 210, 210', 230, 230' may be otherwise secured (e.g., fasteners, friction-fit, etc.) to the terminal body 201, 201', 221, 221'.

In some examples, the adapter port and plug-in connector include a multi-fiber adapter port (e.g., an MPO port, an HMFOC port, etc.) and a multi-fiber plug-in connector (e.g., an MPO connector, an HMFOC connector, etc.). In other examples, the adapter port and plug-in connector include a single-fiber adapter port (e.g., an SC port, an LC port, etc.) and a single-fiber connector (e.g., an SC connector, an LC connector, etc.).

In some examples, bidirectional transmission is used with the WDM module 210, 210'. In such examples, each add and/or drop connection interface location 206 receives both transmit and receive optical signals of a predetermined wavelength or wavelength band. In other examples, unidirectional transmission is used with the WDM module 230, 230'. In such examples, the terminal body defines separate add connection interface locations 226A and drop connection interface locations 226B. Transmit signals can be added to the network (e.g., a daisy-chain of signal distribution arrangements) at the add connection interface locations 226A. Receive signals can be dropped from the network at the drop connection interface locations 226B.

Figure 11:
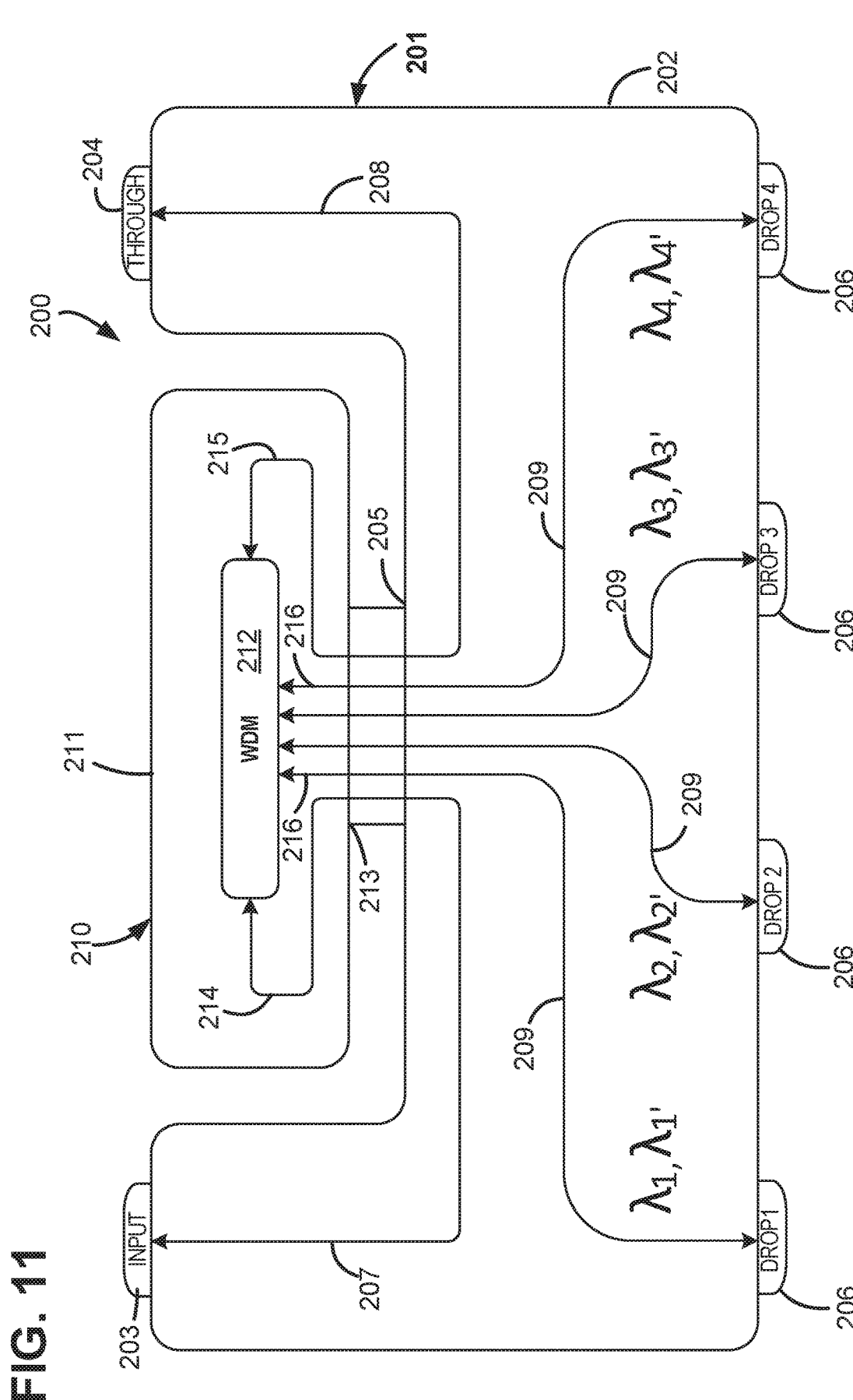
FIG. 11 is a schematic diagram of an example signal distribution arrangement including an example bidirectional WDM module mounted to an example terminal body in accordance with the principles of the present disclosure.

In FIG. 11, an example signal distribution arrangement 200 includes a terminal body 201 having a housing 202 that defines an input connection interface location 203, a pass-through connection interface location 204, the module connection interface location 205, and the add/drop connection interface locations 206. In the example shown, the terminal housing 202 defines four add/drop connection interface locations 206. In other examples, the terminal housing 202 may defines a greater or lesser number (e.g., one, two, three, six, eight, ten, twelve, sixteen, etc.) of add/drop connection interface locations 206. For example, the terminal housing 202 may have a single add/drop connection interface location 206.

The module connection interface location 205 receives optical lines not only from the add/drop connection interface locations 206, but also from the input connection interface location 203 and the pass-through connection interface location 204. An input line 207 extends between the input connection interface location 203 and the module connection interface location 205. A pass-through line 208 extends between the pass-through connection interface location 204 and the module connection interface location 205. Add/drop lines 209 extend between the add/drop connection interface locations 206 and the module connection interface location 205. In the example shown, the module connection interface location 205 includes a multi-fiber connection interface (e.g., an externally accessible multi-fiber adapter port or an externally accessible multi-fiber plug connector).

In some examples, the input connection interface location 203 is an externally accessible adapter port. In other examples, the input connection interface location 203 is plug-in connector (e.g., terminating a stub cable). In some examples, the pass-through connection interface location 204 is an externally accessible adapter port. In other examples, the pass-through connection interface location 204 is plug-in connector (e.g., terminating a stub cable). In some examples, the add/drop connection interface locations 206 are externally accessible adapter ports. In other examples, the add/drop connection interface locations 206 are plug-in connectors (e.g., terminating stub cables). In still other examples, the terminal 201 may define only one add/drop connection interface location 206 that carries a plurality of optical lines (e.g., a multi-fiber adapter port or multi-fiber plug connector).

The signal distribution arrangement 200 also includes a WDM module 210 having a housing 211 containing a WDM 212. In the example shown, the WDM 212 is a WDM configured for bidirectional transmission. The housing 211 defines a terminal connection interface location 213. A WDM input line 214 extends between the terminal connection interface location 213 and an input to the WDM 212. A first output line 215 extends between the terminal connection interface location 213 and a main output from the WDM 212. One or more second output lines 216 extend between the terminal connection interface location 213 and a second output from the WDM 212. In the example shown, the terminal connection interface location 213 includes a multi-fiber connection interface (e.g., an externally accessible multi-fiber adapter port or an externally accessible multi-fiber plug connector) that fits with the module connection interface location 205 of the terminal body 201.

Accordingly, installing the WDM module 210 at the terminal body 201 optically couples the input connection interface location 203 of the terminal body 201 to the pass-through connection interface location 204 of the terminal body 201 and to the add/drop connection interface locations 206 of the terminal body 201. Prior to installing the WDM module 210 at the terminal body 201, none of the connection interface locations 203, 204, 206 were optically coupled together.

Figure 12:
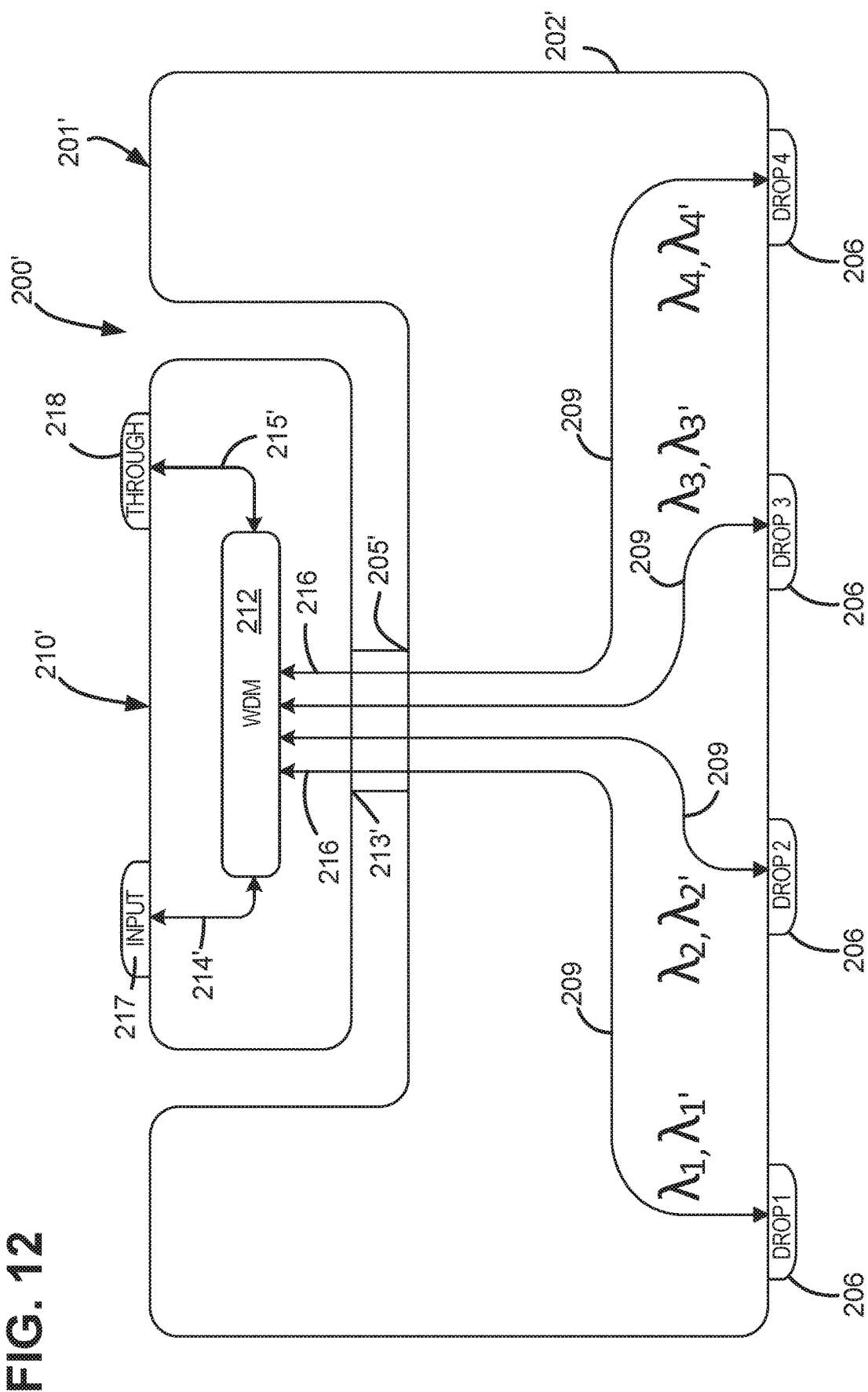
FIG. 12 is a schematic diagram of an example signal distribution arrangement including another example bidirectional WDM module mounted to another example terminal body in accordance with the principles of the present disclosure.

FIG. 12 illustrates another example signal distribution arrangement 200' including a terminal body 201' and a WDM module 210'. The terminal body 201' is substantially the same as the terminal body 201 of FIG. 11 except that the terminal body 201' does not define an input connection interface location or a pass-through connection interface location. Rather, the WDM module 210' defines an input connection interface location 217 and a pass-through connection interface location 218.

Furthermore, in certain examples, the module connection interface location 205' of the terminal body 201' includes fewer optical lines compared to the module connection interface location 205 of the terminal body 201 of FIG. 11. Add/drop lines 209 extend between the add/drop connection interface locations 206 and the module connection interface location 205'. In certain examples, only the optical signals at the second output of the WDM 212 are carried between the terminal body 201' and the WDM module 210'. Accordingly, fewer optical connections are made within the signal distribution arrangement 200' compared to the signal distribution arrangement 200.

In the WDM module 210', an input line 214' extends between the input connection interface location 217 and an input of the WDM 212. A first output line 215' extends between the pass-through connection interface location 218 and the first output of the WDM 212. As with the terminal body 201 of FIG. 11, the terminal body 201' of FIG. 12 also includes one or more second output lines 216 that extend between the terminal connection interface location 213' and the second output from the WDM 212. The second output lines 216 optically couple to respective ones of the add/drop lines 209 of the terminal body 201' when the WDM module 210' is installed at the terminal body 201'.

Figure 13:
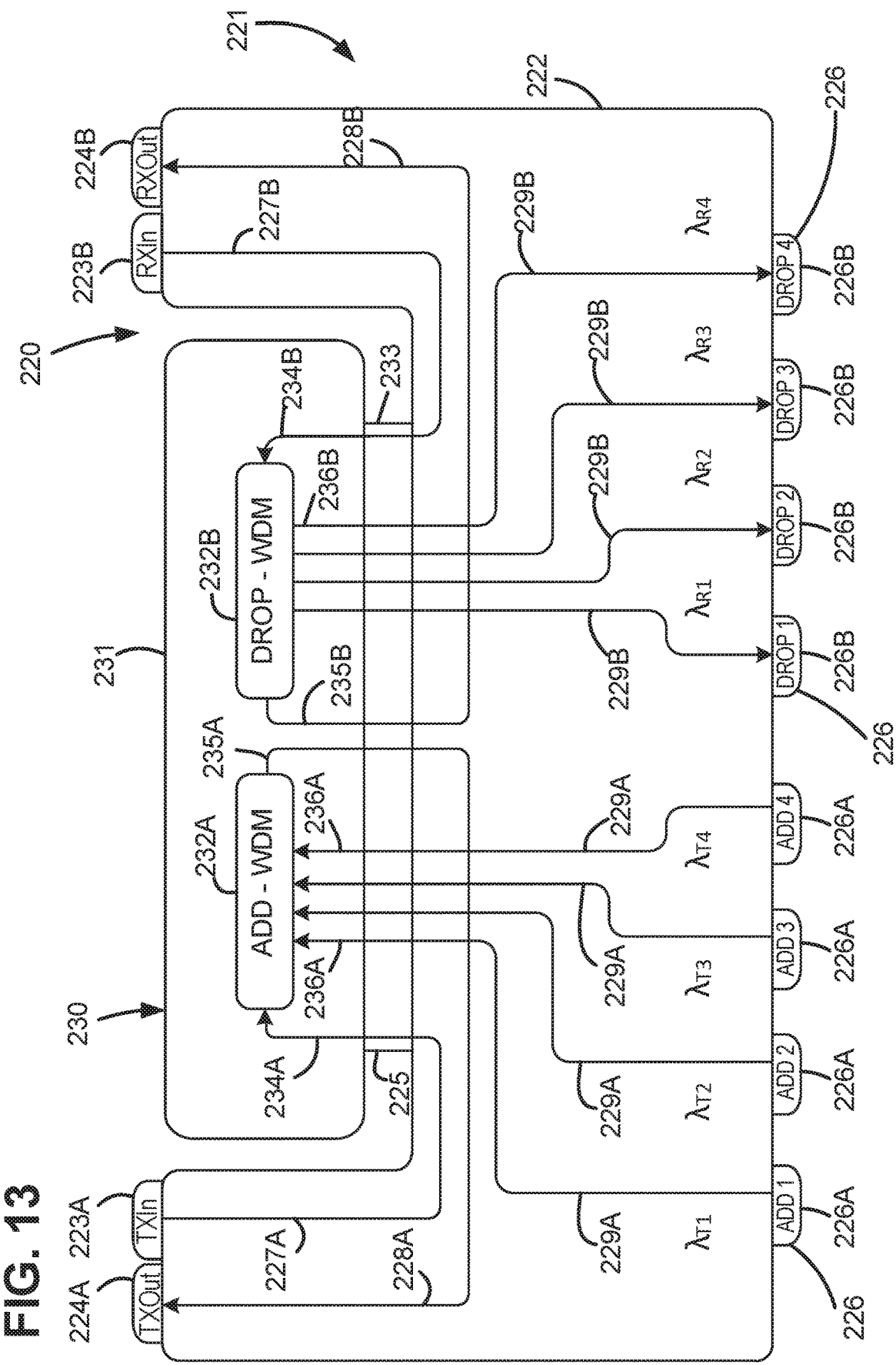
FIG. 13 is a schematic diagram of an example signal distribution arrangement including an example unidirectional WDM module mounted to an example terminal body in accordance with the principles of the present disclosure.

FIG. 13 illustrates another example signal distribution arrangement 220 including a terminal body 221 and a WDM module 230. The signal distribution arrangement 220 differs from the signal distribution arrangement 200 of FIG. 11 in that the signal distribution arrangement 220 is configured for unidirectional transmission. Accordingly, the WDM module 230 of the signal distribution arrangement 220 includes a first WDM 232A for adding optical signals and a second WDM 232B for dropping optical signals. The terminal body 221 defines a first set of add connection interface locations 226A that optically couple to the first WDM 232A and a second set of drop connection interface locations 226B that optically couple to the second WDM 232B.

The terminal body 221 is substantially the same as the terminal body 201 of FIG. 11 except that the terminal body 221 defines two input connection interface locations 223A, 223B, two output connection interface locations 224A, 224B, and separate add/drop connection interface locations 226A, 226B. Respective input lines 227A, 227B extend between the input connection interface locations 223A, 223B and a module connection interface location 225. Respective output lines 228A, 228B extend between the pass-through connection interface locations 224A, 224B and the module connection interface location 225. Add lines 229A extend between the add connection interface locations 226A and the module connection interface location 225. Drop lines 229B extend between the drop connection interface locations 226B and the module connection interface location 225. In the example shown, the module connection interface location 225 includes a multi-fiber connection interface (e.g., an externally accessible multi-fiber adapter port or an externally accessible multi-fiber plug connector).

The WDM module housing 231 defines a terminal connection interface location 233. A first WDM input line 234A extends between the terminal connection interface location 233 and an input to the first WDM 232A. A first pass-through line 235A extends between the terminal connection interface location 233 and a main output from the first WDM 232A. One or more second input lines 236A extend between the terminal connection interface location 233 and a second input from the first WDM 232A. A second WDM input line 234B extends between the terminal connection interface location 233 and an input to the second WDM 232B. A second pass-through line 235B extends between the terminal connection interface location 233 and a main output from the second WDM 232B. One or more second output lines 236B extend between the terminal connection interface location 233 and a second output from the second WDM 232B.

In the example shown, the terminal connection interface location 233 includes a multi-fiber connection interface (e.g., an externally accessible multi-fiber adapter port or an externally accessible multi-fiber plug connector) that fits with the module connection interface location 225 of the terminal body 221.

Installing the WDM module 230 at the terminal body 221 optically couples the first input connection interface location 223A of the terminal body 221 to the first pass-through connection interface location 224A of the terminal body 221 and to the add connection interface locations 226A of the terminal body 221. Prior to installing the WDM module 230 at the terminal body 221, none of the connection interface locations 223A, 224A, 226A were optically coupled together.

Installing the WDM module 230 at the terminal body 221 optically couples the second input connection interface location 223B of the terminal body 221 to the second pass-through connection interface location 224B of the terminal body 221 and to the drop connection interface locations 226B of the terminal body 221. Prior to installing the WDM module 230 at the terminal body 221, none of the connection interface locations 223B, 224B, 226B were optically coupled together.

Replacing the WDM module 230 with a different WDM module (e.g., a WDM module configured to drop a different signal wavelength or set of wavelengths) at the terminal body 221 does not require recabling of the input cables and pass-through cables. Rather, the input and pass-through cables remain connected to the terminal body 221 while the WDM module 230 is being replaced. Replacing the WDM module with a different type of WDM module changes which optical signal wavelengths are available at the add connection interface locations 226A and/or the drop connection interface locations 226B.

Figure 14:
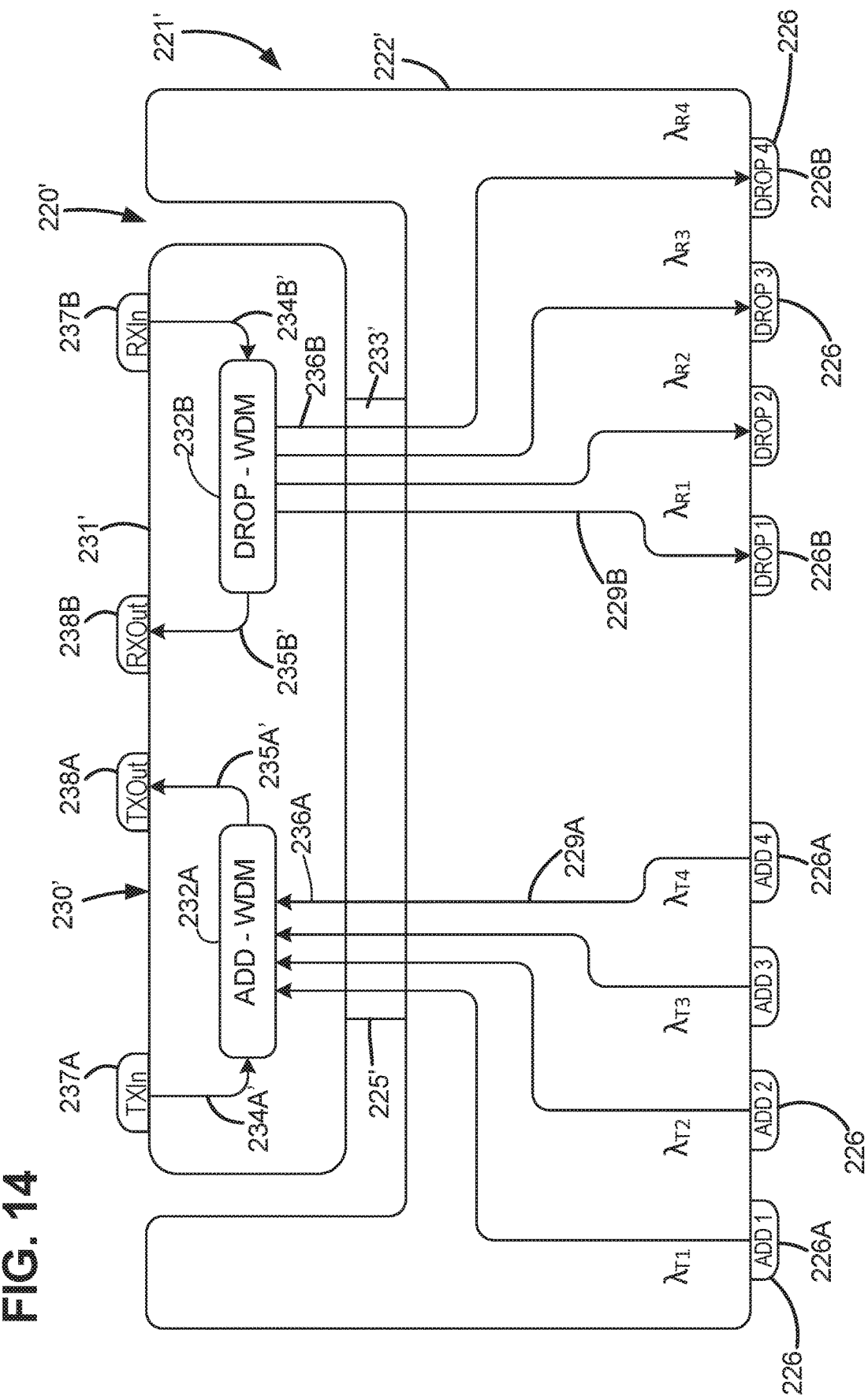
FIG. 14 is a schematic diagram of an example signal distribution arrangement including another example unidirectional WDM module mounted to another example terminal body in accordance with the principles of the present disclosure.

FIG. 14 illustrates another example signal distribution arrangement 220' including a terminal body 221' and a WDM module 230'. The terminal body 221' is substantially the same as the terminal body 221 of FIG. 13 except that the terminal body 221' does not define any input connection interface locations or a pass-through connection interface locations. Rather, the WDM module 230' defines two input connection interface locations 237A, 237B and two pass-through connection interface locations 238A, 238B.

Furthermore, in certain examples, the module connection interface location 225' of the terminal body 221' includes fewer optical lines compared to the module connection interface location 225 of the terminal body 221 of FIG. 13. Add lines 229A extend between the add connection interface locations 226A of the terminal body 221 and the module connection interface location 225'. Drop lines 229B extend between the drop connection interface locations 226B of the terminal body 221 and the module connection interface location 225'. In certain examples, only the optical signals at the second outputs of the WDMs 232A, 232B are carried between the terminal body 221' and the WDM module 230'. Accordingly, fewer optical connections are made within the signal distribution arrangement 220' compared to the signal distribution arrangement 220.

In the WDM module 230', an input line 234A' extends between the input connection interface location 237A and an input of the first WDM 232A. A first pass-through line 235A' extends between the first pass-through connection interface location 238A and the first output of the first WDM 232A. As with the terminal body 221 of FIG. 13, the terminal body 221' of FIG. 14 also includes one or more second input lines 236A that extend between the terminal connection interface location 233' and the second input of the first WDM 232A. The second input lines 236A optically couple to respective ones of the add lines 229A of the terminal body 221' when the WDM module 230' is installed at the terminal body 221'.

An input line 234B' extends between the input connection interface location 237B and an input of the second WDM 232B. A second pass-through line 235B' extends between the second pass-through connection interface location 238B and the first output of the second WDM 232B. One or more second output lines 236B extend between the terminal connection interface location 233' and the second output from the second WDM 232B. The second output lines 236B optically couple to respective ones of the drop lines 229B of the terminal body 221' when the WDM module 230' is installed at the terminal body 221'.

Referring now to FIGS. 15-18, another example signal distribution arrangement 240 includes a terminal body 241 and a separator module (e.g., a bandpass module) 250. As will be discussed herein, multiple types of bandpass modules 250 may be used with multiple terminal bodies 241 of the same type (e.g., containing the same cyclic AWG 244). In some examples, the bandpass module 250 plugs into or otherwise optically couples to the terminal body 241. In other examples, the bandpass module 250 is mounted separately from the terminal body 241. In an example, the bandpass module 250 is mounted at a location spaced from the terminal body 241.

Figure 15:
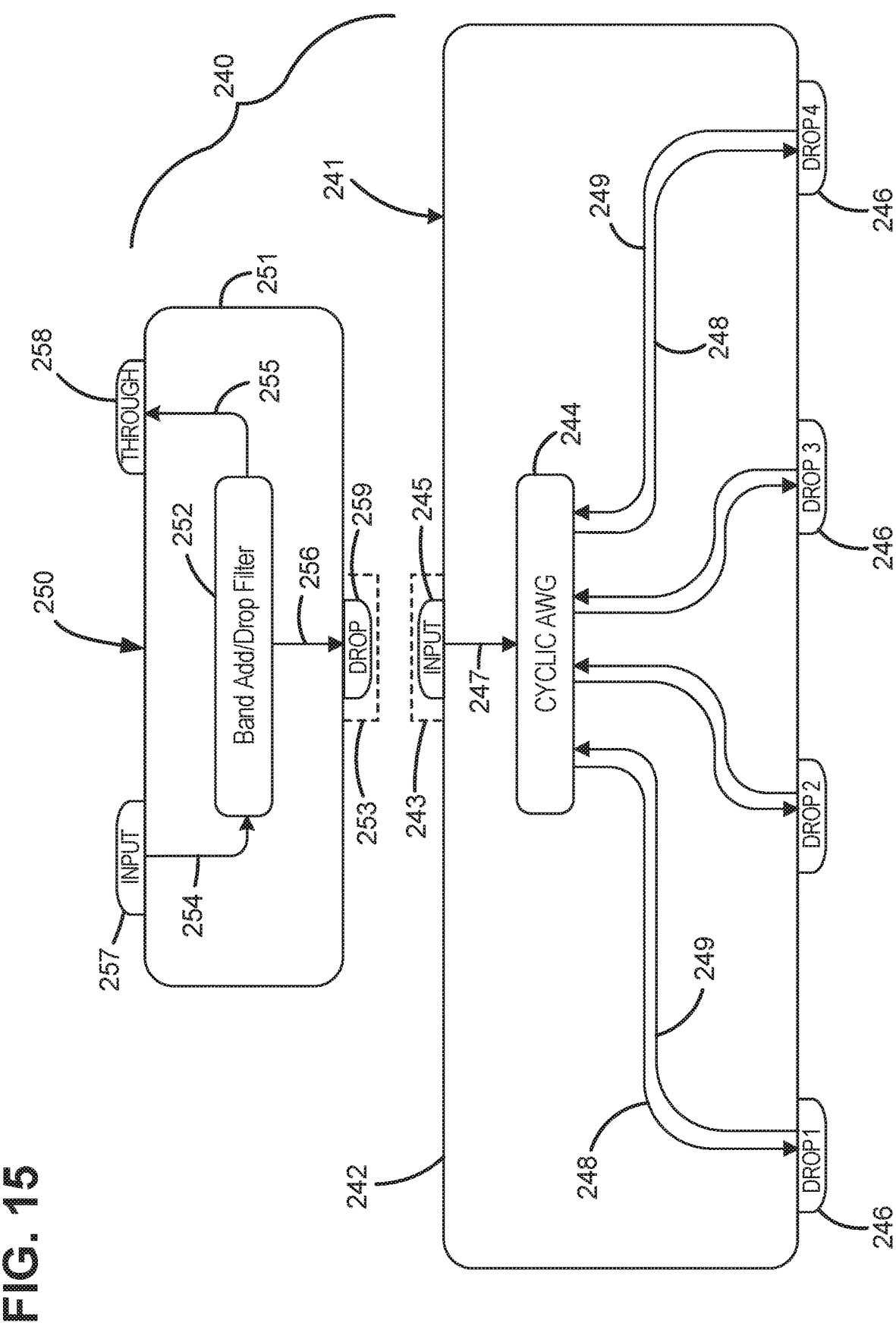
FIG. 15 is a schematic diagram of an example signal distribution arrangement including an example bandpass module configured to optically couple to an example terminal body in accordance with the principles of the present disclosure.

FIG. 15 illustrates the example signal distribution arrangement 240. The terminal body 241 includes a housing 242 carrying a module connection interface location 243, 245 and one or more add/drop connection interface locations 246. The module connection interface location 243, 245 is optically coupled to the add/drop connection interface locations 246 by a cyclic AWG 244. In an example, the module connection interface location 243 is configured for direct connection to the separator module 250. In another example, the module connection interface location 245 is configured for connection to the separator module 250 via a cable.

The cyclic AWG 244 receives optical signals from an input line 247 extending from the module connection interface location 243, 245. The cyclic AWG 244 demultiplexes the optical signals from the input line 247 onto a plurality of channel lines 248 that extend to the add/drop connection interface locations 246. In some implementations, the terminal module 241 is configured for only unidirectional communication. In bidirectional communication implementations, the cyclic AWG 244 also multiplexes optical signals received from channel lines 249 extending from one or more of the add/drop connection interface locations 246 onto the input line 247 for passage back to the bandpass module 250.

In some implementations, both transmit and receive optical signals of predetermined frequencies are routed from the cyclic AWG 244 to each add/drop connection interface location 246. For example, a drop channel line 248 and an add channel line 249 may be routed between the cyclic AWG 244 and the same add/drop connection interface location 246. In other examples, only unidirectional signals may be routed to each add/drop connection interface location 246. For example, only a drop channel line 248 is routed to one add/drop connection interface location 246 while only an add channel line 249 is routed to another add/drop connection interface location 246.

In certain examples, the same cyclic AWG 244 is used in a plurality of the terminal bodies 241 within a daisy-chain or other network of signal distribution arrangements 240 as will be discussed in more detail herein. In an example, the same cyclic AWG 244 is used in all of the terminal bodies 241 within a daisy-chain or other network of signal distribution arrangements 240.

In some implementations, the cyclic AWG 244 has a channel spacing of about 50 GHz. In other implementations, the cyclic AWG 244 can have another channel spacing (e.g., 100 GHz). In some implementations, the cyclic AWG 244 outputs about eight channels. For example, the cyclic AWG 244 may have an 8-skip-0 configuration, an 8-skip-8 configuration (see FIG. 17), etc. In other implementations, the cyclic AWG 244 outputs a greater or lesser number of channels (e.g., three, four, six, nine, ten, twelve, sixteen, etc.). In certain implementations, the cyclic AWG 244 is configured to output channels in both the C Band and the L Band.

Figure 16:
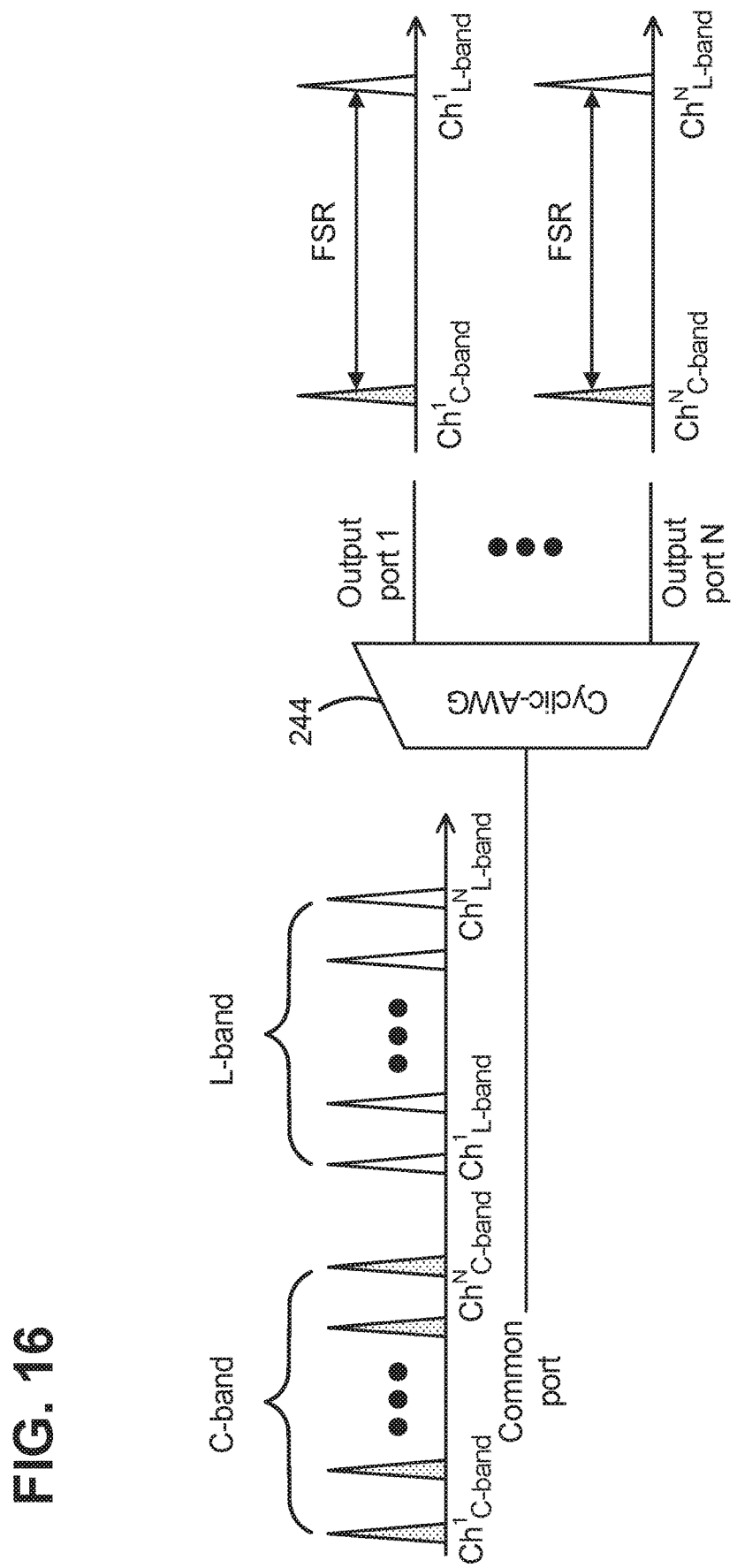
FIG. 16 illustrates a transmission of an example cyclic Arrayed Waveguide Grating (AWG)

For example, FIG. 16 illustrates a transmission of a cyclic AWG 244 as shown in IEC 61753-381-2:2016 (Fibre optic interconnecting devices and passive components—Performance standard—Part 381-2: Cyclic arrayed waveguide grating—Category C). The example cyclic AWG 244 has a demultiplexing property that repeats over a period called the free spectral range (FSR). The free spectral range is the difference between two adjacent operating wavelengths for a given input output path (e.g., output port 1, output 2, . . . , output port N).

Figure 17:
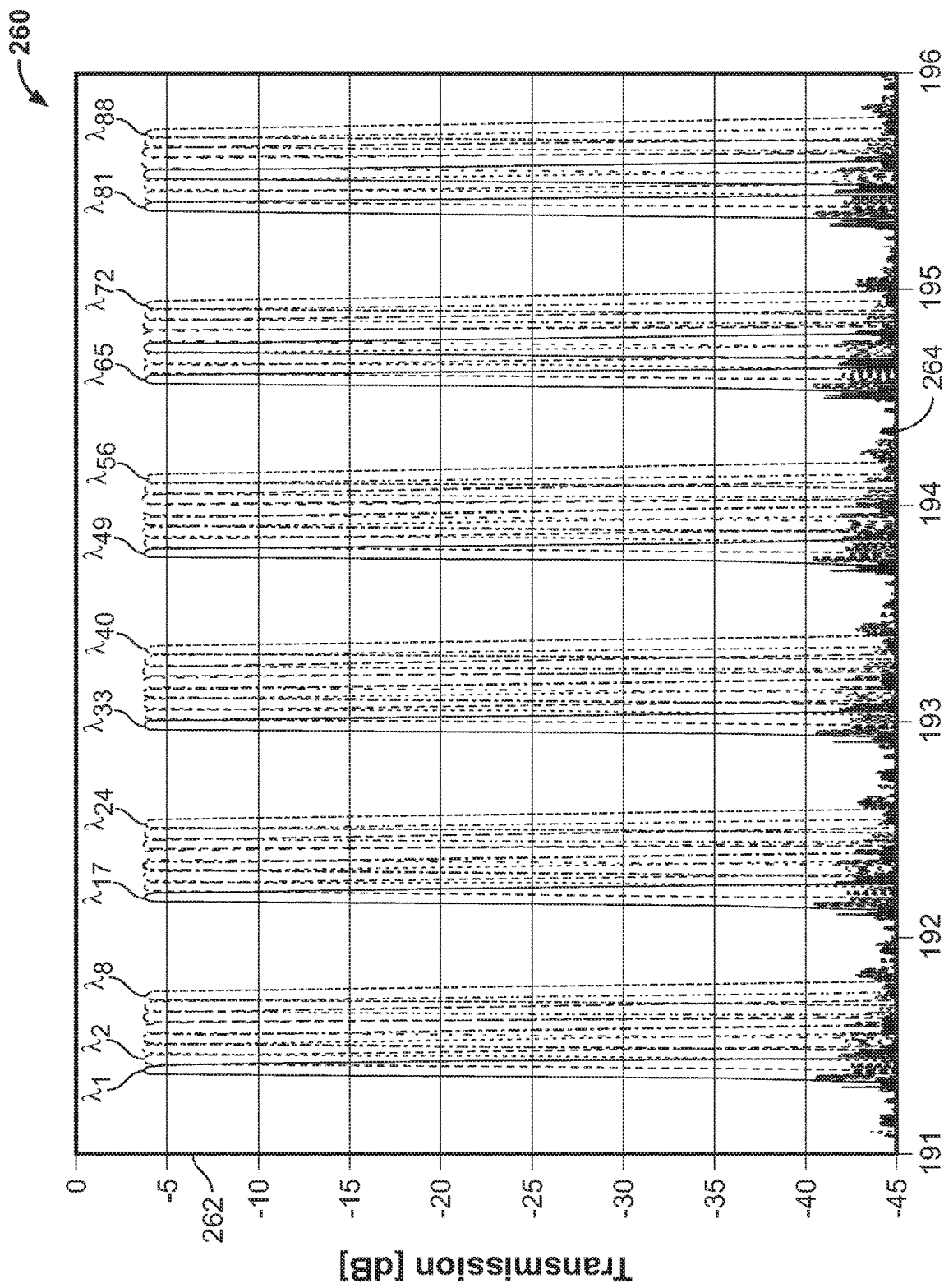
FIG. 17 is a graph of a transmission spectrum of another example cyclic AWG having an 8-skip-8 configuration.

For example, FIG. 17 is a graph 260 of a transmission spectrum of another example cyclic AWG having an 8-skip-8 configuration. The y-axis 262 indicates the transmission in decibels (dB) and the x-axis 264 indicates the frequency of the optical signals in terahertz (THz). Output port 1 of the cyclic AWG of FIG. 17 will output wavelengths (or frequencies) $\lambda 1$, $\lambda 17$, $\lambda 33$, $\lambda 49$, $\lambda 65$ and $\lambda 81$. Output port 2 will output wavelengths $\lambda 2$, $\lambda 18$, $\lambda 34$, $\lambda 50$, $\lambda 66$ and $\lambda 82$. In the same way, output port 8 will output wavelengths $\lambda 8$, $\lambda 24$, $\lambda 40$, $\lambda 56$, $\lambda 72$ and $\lambda 88$. Because of the 8-skip-8 configuration, the wavelengths $\lambda 9$-$\lambda 16$, $\lambda 25$-$\lambda 32$, $\lambda 41$-$\lambda 48$, $\lambda 57$-$\lambda 64$, $\lambda 73$-$\lambda 80$, $\lambda 89$-$\lambda 96$ are not transmitted to any of the output ports of the cyclic AWG.

As will be discussed in more detail herein with reference to FIG. 19, it is preferable in some practical applications that the cyclic AWG outputs only a single wavelength (or frequency) on each output port of the cyclic AWG. Therefore, a corresponding bandpass module 250 can be selected for each signal distribution arrangement 240 to provide optical signals within a predetermined wavelength/frequency range 265 to the corresponding terminal body 241 (see FIG. 18). Accordingly, the optical signals reaching the cyclic AWG 244 within the terminal body 241 will be demultiplexed into the channels $\lambda n$-$\lambda n+7$ corresponding with the predetermined wavelength/frequency range 265.

Figure 18:
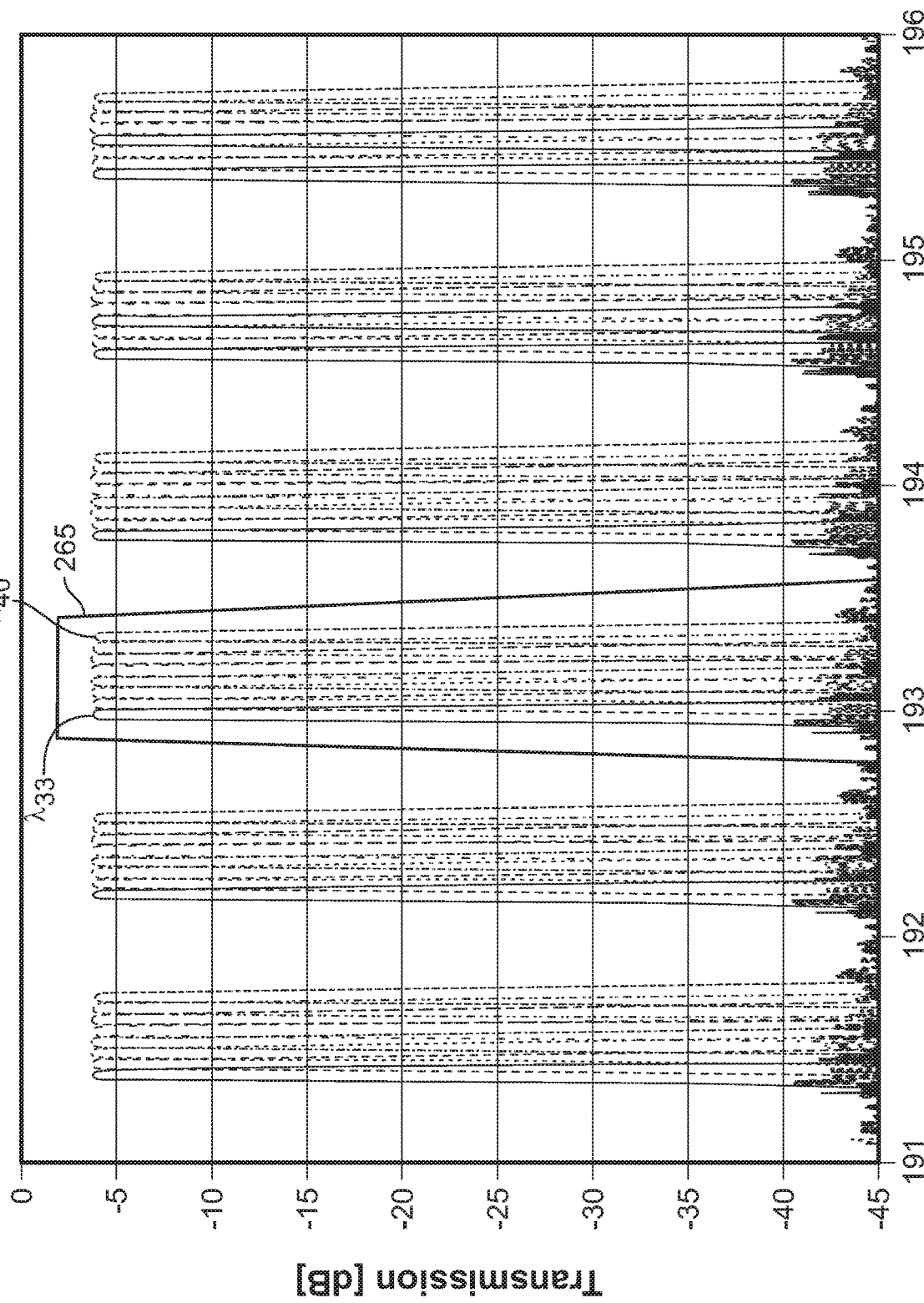
FIG. 18 shows an example transmission spectrum of the cyclic AWG of FIG. 17 having received optical signals filtered by an example bandpass module.

The wavelength range is selected to include only one signal wavelength within the FSR of each channel. For example, FIG. 18 shows an example transmission spectrum of the cyclic AWG of FIG. 17 having received optical signals filtered by an example bandpass module 250. Accordingly, the cyclic AWG of FIG. 18 has received only optical signals within the predetermined wavelength/frequency range 265. In this example, the output channels of the cyclic AWG of FIG. 18 will transmit $\lambda 33$-$\lambda 40$. Different types of bandpass modules 250 filter different predetermined wavelength/frequency ranges 265.

Referring back to FIG. 15, the bandpass module 250 includes a housing 251 carrying an input connection interface location 257, a pass-through connection interface location 258, and a terminal connection interface location 253, 259. In an example, the terminal connection interface location 253 is configured for direct connection to the terminal housing 241. In another example, the terminal connection interface location 259 is configured to connection to the terminal housing 241 via a cable.

The module housing 251 contains a bandpass filter 252 that optically couples the input connection interface location 257, the pass-through connection interface location 258, and the terminal connection interface location 253, 259. The bandpass filter 252 filters out a select range 265 (FIG. 18) or set of optical signals from the connection interface location 257 to the terminal connection interface location 253, 259. A remainder of the optical signals (i.e., those signals outside of the selected range 265) are passed to the pass-through connection interface location 258. Different types of bandpass modules 250 have different bandpass filters 252. Each different bandpass filter 252 filters out signals having a different wavelength/frequency range 265.

In particular, an input line 254 extends between the input connection interface location 257 and the bandpass filter 252. A first output line 255 extends between the bandpass filter 252 and the pass-through connection interface location 258. A second output line (i.e., an add/drop line) 256 extends between the bandpass filter 252 and the terminal connection interface location 253, 259. The bandpass filter 252 filters out a select wavelength/frequency range 265 from the input line 254 onto the second output line 256. A remainder of the optical signals from the input line 254 are passed to the first output line 255.

Figure 19:
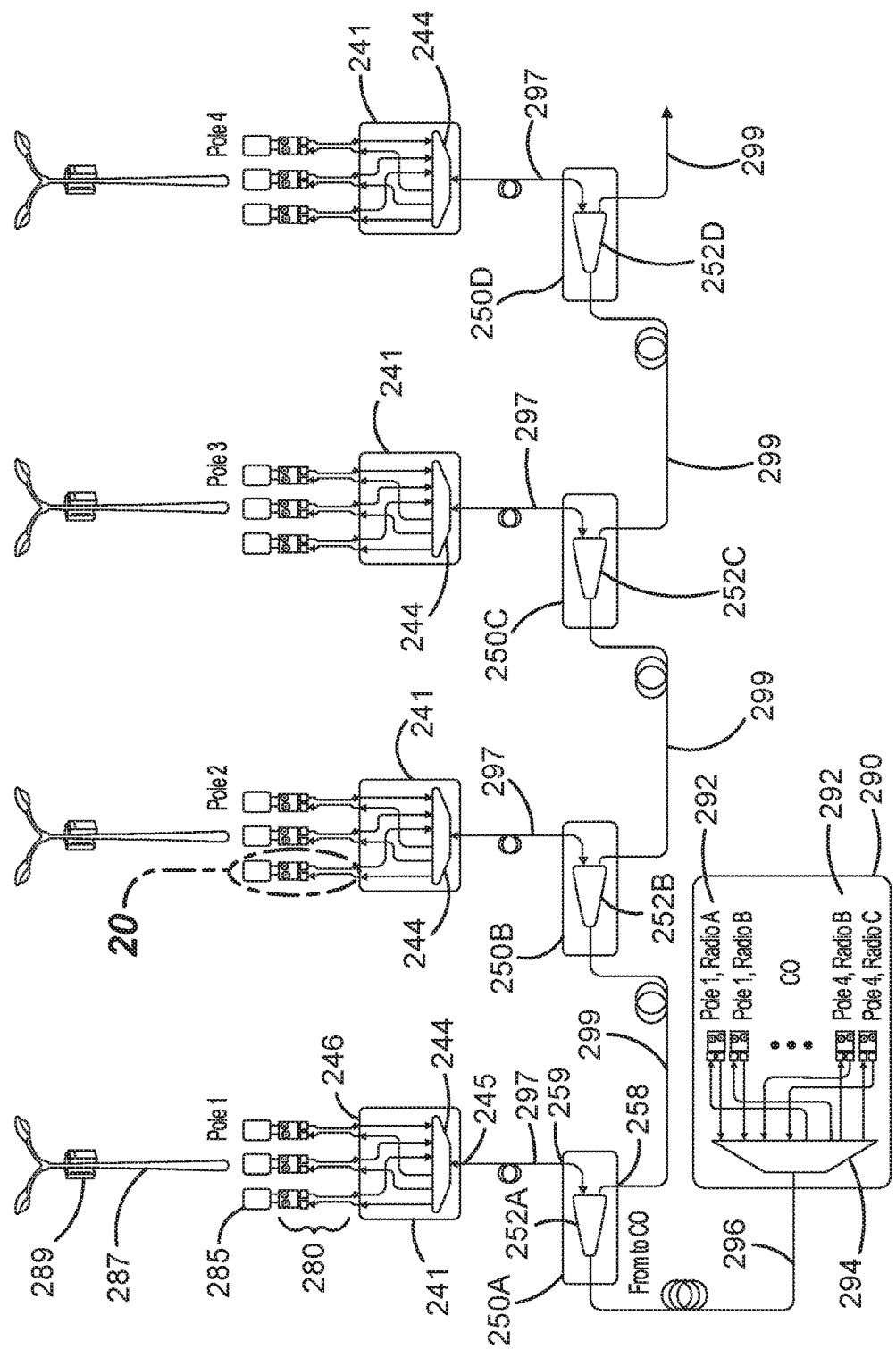
FIG. 19 is a diagram showing multiple signal distribution arrangements chained together in a daisy-chain configuration to distribute optical signals to/from multiple add/drop points along a network route.

Referring to FIG. 19, multiple signal distribution arrangements 240 may be chained together (e.g., in a daisy-chain configuration) to distribute optical signals to multiple add/drop points along a route. In some implementations, the same type of terminal body 241 is used throughout the chain while a different type of bandpass module 250 is paired with each terminal body 241 in the chain. The bandpass module 250 for each terminal body 241 in the chain is unique compared to the other bandpass modules 250 in the chain. In particular, each bandpass module 250 has a different bandpass filter 252 or otherwise selects a unique range 265 of optical signals to be dropped.

In FIG. 19, a chain of signal distribution arrangements 240 are shown receiving optical signals from a central office 290 and dropping optical signals to radios 285 or other equipment. It will be understood that the signal distribution arrangements 240 also receive optical signals from the radios or other equipment and pass these signals back to the central office 290.

In the example shown, each radio 285 is mounted to a pole 287 and coupled (e.g., electrically coupled) to one or more antennas 289. At the central office 290, optical signals from one or more radios 292 or other equipment are multiplexed at a multiplexer 294 onto a feed line 296. The feed line 296 carries optical signals from multiple wavelength ranges (e.g., wavelength ranges in the C-band or in the L-band, or sections thereof). For example, each of the radios 292 may output optical signals within a predetermined frequency range or wavelength range. It will be understood that multiplexer 294 may also have demultiplexing functionality to demultiplex optical signals carried from the signal distribution arrangements 240 to the radios 292 of the central office 290.

The feed line 296 is optically coupled to the input connection interface location 257 of a first bandpass module 250A containing a first bandpass filter 252A. The first bandpass filter 252A drops optical signals within a first wavelength/frequency range (e.g., wavelength range 265 of FIG. 18) to the terminal connection interface location 253, 259. The bandpass filter 252A passes the remainder of the optical signals (i.e., the optical signals outside of the first wavelength/frequency range) to the pass-through connection interface location 258.

A pass-through cable 299 connects two adjacent signal distribution arrangements 240 in the chain. In the example shown, a pass-through cable 299 has a first end coupled to the pass-through connection interface location 258 of the first bandpass module 250A and a second end coupled to the input connection interface location 257 of a second bandpass module 250B. A bandpass filter 252B of the second bandpass module 250B drops optical signals within a second wavelength range to the terminal connection interface location 259 of the second bandpass module 250B. In this way, the optical signals are also dropped at the bandpass filter 252C of bandpass module 250C and the bandpass filter 252D of bandpass module 250D.

In some implementations, the bandpass module 250 is optically coupled to the terminal body 241 by a drop cable 297 (see FIG. 19). In such implementations, the bandpass module 250 is mounted separately from the terminal body 241. In an example, both the bandpass module 250 and the terminal body 241 may be separately mounted to a pole 287. In another example, the terminal body 241 may be mounted to a pole 287 while the corresponding bandpass module 250 is disposed at a remote location (e.g., within a handhole, at an aerial mount, along a distribution conduit (e.g., an underground pipe), at a pedestal or cabinet style terminal, etc.). Each drop cable 297 has a first end optically coupled to the terminal connection interface location 259 of the respective bandpass module 250 and a second end optically coupled to the module connection interface location 245 of the terminal body 241 so that the drop cable 297 is optically coupled to the input line 247.

In other implementations, the bandpass module 250 is directly coupled to the terminal body 241. In an example, one of the module connection interface location 243 and the terminal connection interface location 253 is an externally accessible adapter port and the other is a plug-in connector that fits within the adapter port. In certain implementations, the adapter port and plug-in connector are ruggedized to environmentally seal between the adapter port and plug-in connector. In some examples, the adapter port and plug-in connector include a single-fiber adapter port (e.g., an SC port, an LC port, etc.) and a single-fiber connector (e.g., an SC connector, an LC connector, etc.). In some implementations, the bandpass module 250 and the terminal body 241 have a twist-to-lock connection (e.g., threads, bayonet, etc.) therebetween. For example, the twist-to-lock connection may be formed between the adapter port and plug-in connector. In other implementations, the bandpass module 250 may be otherwise secured (e.g., fasteners, friction-fit, etc.) to the terminal body 241.

Figure 20:
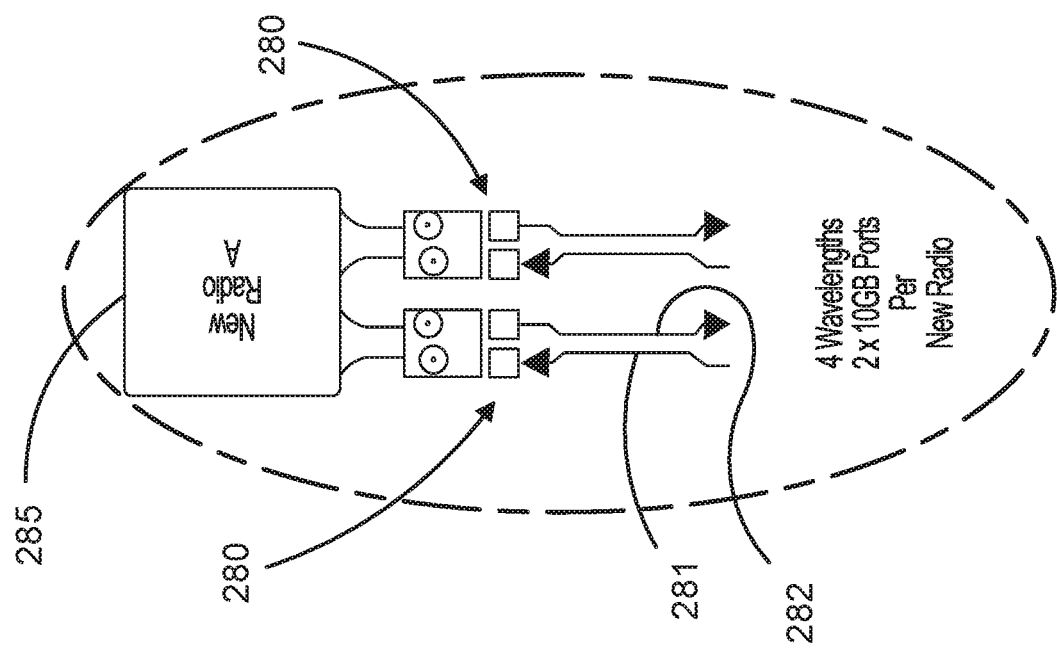
FIG. 20 is an enlarged view of a portion of FIG. 19.

The dropped signals are passed between the terminal body 241 and the radio 285 using a transceiver cable 280. In certain implementations, the transceiver cable 280 is an active/optical cable having a first end terminated at an optical connection arrangement (e.g., one or more optical plug connectors) and an opposite second end terminated at an electrical connection arrangement (e.g., a small form-factor pluggable (SFP) transceiver). In certain examples, the transceiver cable 280 includes a transmit fiber 281 and a receive fiber 282 extending between the first and second ends (see FIG. 20). In other examples, the transceiver cable 280 can have any number of fibers (e.g., one, four, etc.).

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Example Aspects of the Disclosure

Aspect 1. A signal distribution arrangement comprises a terminal body and a separator module. The signal distribution arrangement defines an input connection interface location, a pass-through connection interface location, and a plurality of add/drop connection interface locations. The separator module filters, splits, or otherwise separates out a portion of the optical signals received at the input connection interface location from a remainder of the optical signals. The separated optical signals are available at the add/drop connection interface locations. The remainder of the optical signals are available at the pass-through connection interface location.

Aspect 2. The signal distribution arrangement of aspect 1, wherein the separator module includes an asymmetric optical tap.

Aspect 3. The signal distribution arrangement of aspect 1, wherein the separator module includes a wave division multiplexer.

Aspect 4. The signal distribution arrangement of aspect 3, wherein the wave division multiplexer is one of a plurality of wave division multiplexers.

Aspect 5. The signal distribution arrangement of aspect 1, wherein the separator module includes a bandpass filter.

Aspect 6. The signal distribution arrangement of any of the above aspects, wherein the terminal body includes a symmetric power splitter.

Aspect 7. The signal distribution arrangement of any of aspects 1-5, wherein the terminal body includes a cyclic AWG.

Aspect 8. The signal distribution arrangement of any of the above aspects, wherein the separator module defines the input connection interface location and the pass-through connection interface location.

Aspect 9. The signal distribution arrangement of any of aspects 1-7, wherein the terminal body defines the input connection interface location and the pass-through connection interface location.

Aspect 10. The signal distribution arrangement of any of the above aspects, wherein the separator module is directly connected to the terminal body.

Aspect 11. The signal distribution arrangement of aspect 10, wherein the separator module is pluggable into the terminal body.

Aspect 12. The signal distribution arrangement of aspect 10, wherein the separator module connects to the terminal body using a twist-to-lock connection interface.

Aspect 13. The signal distribution arrangement of any of aspects 1-9, wherein the separator module optically couples to the terminal body using a drop cable.

Aspect 14. The signal distribution arrangement of any of the above aspects, wherein each add/drop connection interface location is configured to receive bidirectional communication.

Aspect 15. The signal distribution arrangement of any of aspects 1-13, wherein each add/drop connection interface location is configured to receive unidirectional communication.

Aspect 16. A signal distribution arrangement comprises an input connection interface location; a pass-through connection interface location; a terminal body; and a separator module that mechanically mounts to the terminal body. The terminal body defines a module connection interface location, at least a first drop connection interface location, and an optical circuit extending between the module connection interface location and the first drop connection interface location. The separator module carries an optical device having a first output and at least a second output. The separator module defines a terminal connection interface location and an output line extending between the terminal connection interface location and the second output of the optical device. The terminal connection interface location is configured to mate with the module connection interface location of the terminal body to optically couple the output line to the optical circuit of the terminal body. The optical device separates the optical signals received at the input connection interface location into pass-through optical signals, which are carried from the first output of the optical device to the pass-through connection interface location, and drop optical signals, which are carried from the second output of the optical device, into the terminal body via the terminal connection interface location and the module connection interface location, and to the drop connection interface location via the optical circuit. The pass-through optical signals have a larger portion of the optical signals compared to the drop optical signals.

Aspect 17. The signal distribution arrangement of aspect 16, wherein the terminal body defines the input connection interface location and the pass-through connection interface location.

Aspect 18. The signal distribution arrangement of aspect 16, wherein the separator module defines the input connection interface location and the pass-through connection interface location.

Aspect 19. The signal distribution arrangement of any of aspects 16-18, wherein the terminal connection interface location of the separator module defines a multi-fiber connection interface.

Aspect 20. The signal distribution arrangement of any of aspects 16-17, wherein the terminal connection interface location of the separator module defines an input connection interface, a pass-through connection interface, and a drop line connection interface.

Aspect 21. The signal distribution arrangement of any of aspects 16-20, wherein the drop connection interface locations are ruggedized.

Aspect 22. The signal distribution arrangement of any of aspects 16-21, wherein the optical device includes an asymmetric optical tap.

Aspect 23. The signal distribution arrangement of aspect 22, wherein the terminal body holds an symmetrical optical splitter, wherein the first drop connection interface location is one of a plurality of drop connection interface locations defined by the terminal body, wherein the optical circuit includes a splitter input fiber, which extends between the module connection interface location and an input of the optical splitter, and a plurality of splitter output fibers, which extend between an output of the optical splitter and the drop connection interface locations.

Aspect 24. The signal distribution arrangement of aspect 23, wherein the pass-through optical signals having a higher power percentage of the optical signals compared to the drop optical signals.

Aspect 25. The signal distribution arrangement of any of aspects 16-21, wherein the optical device includes a WDM.

Aspect 26. The signal distribution arrangement of aspect 25, wherein the WDM is configured for bidirectional transmission.

Aspect 27. The signal distribution arrangement of aspect 25, wherein the WDM is a first WDM configured for unidirectional transmission that optically couples to the drop connection interface location; and wherein the separator module also includes a second WDM configured for unidirectional transmission; and wherein the terminal body defines a plurality of add ports that optically couple to the second WDM.

Aspect 28. The signal distribution arrangement of aspect 25, wherein the pass-through optical signals having a larger set of wavelengths of the optical signals compared to the drop optical signals.

Aspect 29. A method of installing a signal distribution arrangement at a node in an optical network comprises determining a number of drop connection interface locations desired at the node; selecting a terminal body type from a plurality of terminal body types based on the determined number of drop connection interface locations; obtaining a terminal body having the selected terminal body type, the terminal body having the determined number of drop connection interface locations; determining an optical signal power level desired to be received at each drop connection interface location; selecting a tap module type from a plurality of tap module types based on the determined optical signal power level and the determined number of drop connection interface locations, each of the tap module types having a different asymmetric split ratio; obtaining a tap module having the selected tap module type, the tap module carrying an asymmetric optical tap; and mechanically mounting the selected tap module to the selected terminal body to optically couple the asymmetric optical tap to the drop connection interface locations.

Aspect 30. A method of installing a signal distribution arrangement at a node in an optical network comprises determining a number of drop connection interface locations desired at the node; selecting a terminal body type from a plurality of terminal body types based on the determined number of drop connection interface locations; obtaining a terminal body having the selected terminal body type, the terminal body having the determined number of drop connection interface locations; determining a respective optical signal wavelength desired to be dropped to each drop connection interface location; selecting a WDM module type from a plurality of WDM module types based on the determined optical signal wavelength, each of the WDM module types having a different dropped optical signal wavelength; obtaining a WDM module having the selected dropped optical signal wavelength, the WDM module carrying a WDM; and mechanically mounting the selected WDM module to the selected terminal body to optically couple the WDM to the drop connection interface locations.

Aspect 31. A method of installing a signal distribution arrangement at a node in an optical network, the method comprising:

determining a number of drop connection interface locations desired at the node;

selecting a terminal body type from a plurality of terminal body types based on the determined number of drop connection interface locations;

obtaining a terminal body having the selected terminal body type, the terminal body having the determined number of drop connection interface locations;

determining an optical signal power level desired to be received at each drop connection interface location;

selecting a tap module type from a plurality of tap module types based on the determined optical signal power level and the determined number of drop connection interface locations, each of the tap module types having a different asymmetric split ratio;

obtaining a tap module having the selected tap module type, the tap module carrying an asymmetric optical tap; and mechanically mounting the selected tap module to the selected terminal body to optically couple the asymmetric optical tap to the drop connection interface locations.

Aspect 32. A method of installing a signal distribution arrangement at a node in an optical network, the method comprising:

determining a number of drop connection interface locations desired at the node;

selecting a terminal body type from a plurality of terminal body types based on the determined number of drop connection interface locations;

obtaining a terminal body having the selected terminal body type, the terminal body having the determined number of drop connection interface locations;

determining a respective optical signal wavelength desired to be dropped to each drop connection interface location;

selecting a WDM module type from a plurality of WDM module types based on the determined optical signal wavelength, each of the WDM module types having a different dropped optical signal wavelength;

obtaining a WDM module having the selected dropped optical signal wavelength, the WDM module carrying a WDM; and mechanically mounting the selected WDM module to the selected terminal body to optically couple the WDM to the drop connection interface locations.

Aspect 33. A signal distribution arrangement comprising:

a terminal body defining an interior, the terminal body defining an input connection interface location, a pass-through connection interface location, a plurality of drop connection interface locations, and a module connection interface location, the terminal body housing an optical splitter having an input and having outputs optically coupled to the drop connection interface locations; and a tap module configured to mechanically couple to the terminal body at the module connection interface location, the tap module having an input line, a first output line, and a second output line, the tap module housing an optical tap that is configured to power split an optical signal received at the input line into a first split signal on the first output line and a second split signal on the second output line, the second split signal having less power than the first split signal, wherein when the tap module is mechanically coupled to the terminal body at the module connection interface location:

the input line of the tap module is optically coupled to the input connection interface location of the terminal body, the first output line of the tap module is optically coupled to the pass-through connection interface location of the terminal body, and the second output line of the tap module is optically coupled to the input of the optical splitter of the terminal body.

Aspect 34. The signal distribution arrangement of aspect 33, wherein the module connection interface location is ruggedized to environmentally seal between the tap module and the terminal body.

Aspect 35. The signal distribution arrangement of aspect 33, wherein the module connection interface location includes a multi-fiber connection interface accommodating the input line, the first output line, and the second output line of the tap module.

Aspect 36. The signal distribution arrangement of aspect 35, wherein the multi-fiber connection interface includes a multi-fiber adapter port.

Aspect 37. The signal distribution arrangement of aspect 35, wherein the multi-fiber connection interface includes a multi-fiber plug connector.

Aspect 38. The signal distribution arrangement of aspect 33, wherein the module connection interface location includes a first single-fiber connection interface for the input line, a second single-fiber connection interface for the first output line, and a third single-fiber connection interface for the second output line.

Aspect 39. The signal distribution arrangement of aspect 38, wherein each of the first, second, and third single-fiber connection interfaces include adapter ports.

Aspect 40. The signal distribution arrangement of aspect 39, wherein each of the first, second, and third single-fiber connection interfaces include plug connectors.

Aspect 41. The signal distribution arrangement of aspect 33, wherein the input connection interface location and the module connection interface location have different color indicia.

Aspect 42. The signal distribution arrangement of aspect 41, wherein and the drop connection interface locations have color indicia that is different from the color indicia of the input connection interface location and is different from the color indicia of the module connection interface location.

Aspect 43. A separator module comprising:

a body defining a sealed interior, the body defining at least one connection interface location that is ruggedized to environmentally seal the interior of the body;

an asymmetric optical tap member disposed within the sealed interior of the body, the asymmetric optical tap member having an input, a first output, and a second output, the asymmetric optical tap member being configured to power split an optical signal received at the input so that a first split signal is directed to the first output and a second split signal is directed to the second output, the second split signal having less power than the first split signal;

an input line carried within the body and extending between the at least one connection interface location and the input of the asymmetric optical tap member;

a pass-through line carried within the body and extending from the first output of the asymmetric optical tap member; and a tap line carried within the body and extending from the second output of the asymmetric optical tap member.

Aspect 44. The separator module of aspect 43, wherein the at least one connection interface location is an input connection interface location; and wherein the body also defines a pass-through connection interface location and a tap connection interface location that are separate from the input connection interface location, the pass-through line extending between the first output of the asymmetric optical tap member and the pass-through connection interface location, and the tap line extending between the second output of the asymmetric optical tap member and the tap connection interface location.

Aspect 45. The separator module of aspect 44, wherein the pass-through connection interface and the tap connection interface are each ruggedized to environmentally seal the interior of the body.

Aspect 46. The separator module of any of aspects 44 and 45, wherein the input connection interface location, the pass-through connection interface location, and the tap connection interface location are each single-fiber connector interface locations.

Aspect 47. The separator module of any of aspects 44-46, wherein the input connection interface location, the pass-through connection interface location, and the tap connection interface location are color-coded.

Aspect 48. The separator module of aspect 43, wherein the at least one connection interface location is a multi-fiber connection interface location, wherein each of the input line, the pass-through line, and the tap line are routed to the multi-fiber connection interface location.

Aspect 49. The separator module of aspect 43, wherein the at least one connection interface location is an optical port.

Aspect 50. The separator module of aspect 43, wherein the at least one connection interface location is an optical plug.

Aspect 51. The separator module of aspect 43, wherein the tap line is a first tap line, wherein the wherein the asymmetric optical tap member has a third output, wherein the asymmetric optical tap member is configured to power split the optical signal received at the input so that a third split signal is directed to the third output, the third split signal having less power than the first split signal.

Aspect 52. A communications distribution system including a plurality of components from which select components are chosen and installed to form a signal distribution arrangement, the plurality of components comprising:
 a plurality of terminal bodies including at least a first terminal body and a second terminal body, each of the first and second terminal bodies including an input connection interface location, a pass-through connection interface location, a module connection interface location, and a plurality of drop connection interface locations, the first terminal body having a different number of drop connection interface locations than the second terminal body; and
 a plurality of tap modules including at least a first tap module and a second tap module, each of the first and second tap modules being configured to mechanically couple to any of the terminal bodies of the plurality at the respective module connection interface location, each tap module having an input line, a first output line, and a second output line, each tap module housing an optical tap that is configured to power split an optical signal received at the respective input line into a first split signal on the respective first output line and a second split signal on the respective second output line, the second split signal of each tap module having less power than the first split signal of the tap module, wherein the second split signal of the first tap module is different than the second split signal of the second tap module.

Aspect 53. The communications distribution system of aspect 52, wherein the first terminal body houses a first optical power splitter having outputs optically coupled to the respective drop connection interface locations.

Aspect 54. The communications distribution system of aspect 53, wherein the second terminal body houses a second optical power splitter having outputs optically coupled to the respective drop connection interface locations, the second optical power splitter having a different split ratio than the first optical power splitter.

Aspect 55. The communications distribution system of aspect 52, wherein each of the tap modules is mechanically mountable to any of the terminal bodies at the respective module connection interface location.

Aspect 56. A method of configuring an optical network comprising:
 selecting a terminal body type from a plurality of terminal body types, each terminal body type including a terminal body defining an input connection interface location, a pass-through connection interface location, a module connection interface location, and a plurality of drop connection interface locations, wherein each terminal body type of the plurality has a different number of drop connection interface locations from the other terminal body types;
 selecting a tap module type from a plurality of tap module types, each tap module type including a module body having an input line, a first output line, and a second output line, each tap module housing an optical tap that is configured to power split an optical signal received at the respective input line into a first split signal on the respective first output line and a second split signal on the respective second output line, the second split signal of each tap module having less power than the first split signal of the tap module, wherein the second split signal of the first tap module is different than the second split signal of the second tap module; and
 mounting the module body of the selected tap module type to the module connection interface location of the terminal body of the selected terminal body type, thereby optically coupling the input connection interface location to the pass-through connection interface location and to the drop connection interface locations.

Aspect 57. The method of aspect 56, wherein mounting the module body to the module connection interface location of the terminal body comprises plugging a connector interface arrangement of the module body into a port arrangement defined by the terminal body.

Aspect 58. The method of aspect 57, wherein the connector interface arrangement includes a multi-fiber plug connector and the port arrangement includes a multi-fiber adapter port.

Aspect 59. The method of aspect 57, wherein the connector interface arrangement includes a plurality of single-fiber plug connectors and the port arrangement includes a plurality of single-fiber adapter ports.

What is claimed is:

1. A signal distribution arrangement comprising:
 a terminal body defining an input connection interface location and a plurality of output connection interface locations; and
 a separator module defining an input connection interface location, a pass-through connection interface location, and a terminal connection interface location, the separator module being configured to mechanically couple to the terminal body so that the terminal connection interface location is optically coupled to the input connection interface location of the terminal body, the pass-through connection interface location and the input connection interface location of the separator module being accessible from an exterior of the signal distribution arrangement when the separator module is mechanically mounted to the terminal body, the separator module being configured to separate out a portion of any optical signals received at the input connection interface location of the separator module from a remainder of the optical signals, the separated portion of the optical signals being carried to the terminal connection interface location, and the remainder of the optical signals being carried to the pass-through connection interface location.

2. The signal distribution arrangement of claim 1, wherein the separator module includes an asymmetric optical tap, and wherein the separated portion of the optical signals has less power than the remainder of the optical signals.

3. The signal distribution arrangement of claim 2, wherein the terminal body includes a symmetric power splitter.

4. The signal distribution arrangement of claim 1, wherein the separator module includes a wave division multiplexer; and wherein the separated portion of the optical signals has a different set of one or more wavelengths than the remainder of the optical signals.

5. The signal distribution arrangement of claim 4, wherein the wave division multiplexer is an add wave division multiplexer; and wherein the separator module also includes a drop wave division multiplexer.

6. The signal distribution arrangement of claim 5, wherein the drop wave division multiplexer also outputs a separated portion of optical signals to the output connection interface locations.

7. The signal distribution arrangement of claim 5, wherein the input connection interface location of the separator module is a first input connection interface location; and
wherein the separator module defines a second input connection interface location separate from the first input connection interface location, each of the first and second input connection interface locations leading to a respective one of the add wave division multiplexer and the drop wave division multiplexer.

8. The signal distribution arrangement of claim 1, wherein the separator module includes a bandpass filter.

9. The signal distribution arrangement of claim 8, wherein the terminal body includes a cyclic AWG.

10. The signal distribution arrangement of claim 1, wherein the separator module is pluggable into the terminal body.

11. The signal distribution arrangement of claim 10, wherein the separator module connects to the terminal body using a twist-to-lock connection interface.

12. An optical distribution system comprising:
a plurality of separator modules, each separator module having an input connection interface location, a pass-through connection interface location, and a termination connection interface location, the separator modules being daisy-chained together so that the pass-through connection interface location of each separator module is optically coupled to the input connection interface location of a subsequent separator module in the chain by a pass-through cable until a final separator module in the chain, each separator module including a respective signal separator that separates out a different portion of optical signals received at the respective input connection interface location; and
a plurality of terminal bodies each having a module connection interface location and a plurality of add/drop connection interface locations, each terminal body configured to carry optical signals between the module connection interface location and the add/drop connection interface locations, wherein the terminal bodies are identical to each other.

13. The optical distribution system of claim 12, further comprising a plurality of drop cables, each drop cable extending between a first end and a second end, the first end being coupled to the termination connection interface location of a respective one of the separator modules and the second end being coupled to the module connection interface location of a respective one of the terminal bodies.

14. The optical distribution system of claim 12, wherein the signal separator in each separator module includes a bandpass filter, and wherein the bandpass filter of each separator module is configured to filter out a different wavelength band than the bandpass filter of each other separator module.

15. The optical distribution system of claim 12, wherein the signal separator in each separator module includes a wave division multiplexer, and wherein the wave division multiplexer of each separator module is configured to filter out a different set of wavelengths than the wave division multiplexer of each other separator module.

16. The optical distribution system of claim 12, wherein the signal separator in each separator module includes an optical tap; and wherein the optical tap in each separator module is configured to tap a different percentage of power than the optical tap of each other separator module.

17. The optical distribution system of claim 12, wherein at least some of the terminal bodies are mounted to respective poles and optically coupled to respective antennas disposed at the poles.

18. The optical distribution system of claim 17, wherein corresponding ones of the separator modules also are mounted to the respective poles.

19. The optical distribution system of claim 17, wherein corresponding ones of the separator modules also are disposed at locations remote from the poles.

20. The optical distribution system of claim 12, wherein the signal separator in each separator module includes a bandpass filter; and wherein each terminal body includes a cyclic AWG.

* * * * *